(12) United States Patent
Ozaki et al.

(10) Patent No.: US 12,539,880 B2
(45) Date of Patent: Feb. 3, 2026

(54) VEHICLE CONTROL DEVICE

(71) Applicant: Hitachi Astemo, Ltd., Hitachinaka (JP)

(72) Inventors: Koichiro Ozaki, Hitachinaka (JP);
Masashi Seimiya, Hitachinaka (JP);
Tomoyasu Sakaguchi, Hitachinaka (JP); Yoshitaka Fukasawa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 109 days.

(21) Appl. No.: 17/609,462

(22) PCT Filed: Jun. 19, 2020

(86) PCT No.: PCT/JP2020/024074
§ 371 (c)(1),
(2) Date: Nov. 8, 2021

(87) PCT Pub. No.: WO2021/002219
PCT Pub. Date: Jan. 7, 2021

(65) Prior Publication Data
US 2022/0227387 A1 Jul. 21, 2022

(30) Foreign Application Priority Data
Jul. 3, 2019 (JP) .................. 2019-124119

(51) Int. Cl.
*B60W 30/06* (2006.01)
*B60W 50/14* (2020.01)
(Continued)

(52) U.S. Cl.
CPC .......... *B60W 60/001* (2020.02); *B60W 50/14* (2013.01); *G01C 21/28* (2013.01);
(Continued)

(58) Field of Classification Search
CPC ............... B60W 60/001; B60W 50/14; B60W 2520/10; B60W 2555/60; B60W 2556/40;
(Continued)

(56) References Cited

U.S. PATENT DOCUMENTS 10,252,729 B1 * 4/2019 Goldman-Shenhar ....................... B60W 40/09
2015/0269840 A1 9/2015 Hirata
(Continued)

FOREIGN PATENT DOCUMENTS

| JP | 2003-026053 A | 1/2003 |
|---|---|---|
| JP | 2005-091112 A | 4/2005 |

(Continued)

OTHER PUBLICATIONS

Lee et al. Automatic parking of self-driving car based on LiDAR (Year: 2017).*
(Continued)

*Primary Examiner* — Ramya P Burgess
*Assistant Examiner* — Chanmin Park
(74) *Attorney, Agent, or Firm* — Volpe Koenig

(57) ABSTRACT

A vehicle control device includes a processor, a memory and a sensor that acquires surrounding environment information of the vehicle, a host vehicle position estimation unit that estimates the route of the vehicle, a surrounding environment storage unit that stores the surrounding environment information and the route estimated by the host vehicle position estimation unit in association with each other, a vehicle-speed threshold determination unit that sets a vehicle-speed threshold value when the surrounding environment storage unit stores the surrounding environment information and the route in association with each other, and determines whether or not a current vehicle speed exceeds the vehicle-speed threshold value when the surrounding
(Continued)

environment storage unit stores the surrounding environment information and the route, and a warning unit that performs a notification of an excess of the vehicle speed when the vehicle-speed threshold determination unit determines that the vehicle speed exceeds the vehicle-speed threshold value.

8 Claims, 16 Drawing Sheets

(51) Int. Cl.
  *B60W 60/00* (2020.01)
  *G01C 21/28* (2006.01)
  *G08G 1/0962* (2006.01)
(52) U.S. Cl.
  CPC ..... *G08G 1/09623* (2013.01); *B60W 2520/10* (2013.01); *B60W 2555/60* (2020.02); *B60W 2556/40* (2020.02); *B60W 2556/50* (2020.02)
(58) Field of Classification Search
  CPC ............. B60W 2556/60; B60W 30/06; B60W 2050/146; B60W 2510/186; B60W 2520/28; B60W 2552/35; B60W 2552/53; B60W 2556/50; B60W 2720/10; B60W 30/146; G01C 21/28; G01C 21/34; G06V 20/588; G08G 1/09623
  See application file for complete search history.

(56) References Cited

U.S. PATENT DOCUMENTS

| | | | |
|---|---|---|---|
| 2017/0287169 A1* | 10/2017 | Garcia | G06T 7/85 |
| 2017/0313297 A1 | 11/2017 | Okada et al. | |
| 2019/0064826 A1* | 2/2019 | Matsui | G05D 1/0274 |
| 2019/0094025 A1* | 3/2019 | Lu | G01C 21/005 |
| 2019/0355132 A1* | 11/2019 | Kushleyev | G06V 20/56 |

FOREIGN PATENT DOCUMENTS

| | | | | |
|---|---|---|---|---|
| JP | 2006-284334 A | 10/2006 | | |
| JP | 2014-132470 A | 7/2014 | | |
| JP | 2016-099635 A | 5/2016 | | |
| JP | 2018-154218 A | 10/2018 | | |
| WO | WO-2011110924 A1 * | 9/2011 | ............. | B60L 50/16 |
| WO | 2014/077008 A1 | 5/2014 | | |

OTHER PUBLICATIONS

International Search Report, PCT/JP2020/024074, Oct. 6, 2020, 3 pgs.

Written Opinion, PCT/JP2020/024074, Oct. 6, 2020, 8 pgs.

* cited by examiner

VEHICLE CONTROL DEVICE

TECHNICAL FIELD

The present invention relates to a vehicle control device that performs driving assistance.

BACKGROUND ART

In the related art, there has been known a vehicle control device that stores a route on which a host vehicle travels, and surrounding environment information on an object or a white line around the host vehicle and then controls the vehicle by using the stored surrounding environment information, in order to realize an autonomous driving system or a parking assistance system of a vehicle (see PTL 1, for example).

Examples of the surrounding environment information of the host vehicle include position information regarding an object such as a stationary object and a moving object around the host vehicle, road marks (road marking paint) such as white lines and stop lines on the road, and external surrounding situations such as traffic lights and speed signs around the road.

The vehicle control device needs to determine whether the object is a stationary object or a moving object, and detect information such as a position and a speed of the object. In addition, it is necessary to determine a position of a white line on a road on which the host vehicle travels and a meaning of a sign.

Therefore, a vehicle sensor is required to detect the surrounding environment information of the host vehicle. As the vehicle sensor, a camera using an image recognition technique, a sonar using an ultrasonic technique, and a millimeter wave radar using a radio wave having a short wavelength are effective.

In addition, a route on which the host vehicle has traveled can be calculated by acquiring information of the host vehicle position. A method of acquiring the host vehicle position varies depending on a configuration of a system. A method called dead reckoning is known in which the host vehicle position is estimated by using host vehicle sensor information of a wheel speed sensor, a steering angle sensor, an acceleration sensor, a gyro sensor, and the like.

CITATION LIST

Patent Literature

PTL 1: JP 2016-99635 A

SUMMARY OF INVENTION

Technical Problem

However, the detection performance of the vehicle sensor may change depending on a speed range of the host vehicle. Specifically, regarding detection of an object around the host vehicle, a position of a white line, and sign contents, erroneous detection or non-detection increases.

For example, a sonar or a monocular camera that detects information in the vicinity of a vehicle has a limited vehicle speed range allowing detection with high accuracy, due to a relation of a detection range. In addition, the millimeter wave radar has less change in the detection accuracy depending on the vehicle speed range, but the shape accuracy of an object is lower than that of the sonar.

In addition, in the sonar and the millimeter wave radar, transmission waves are irregularly reflected due to cracks, unevenness, or the like of a road surface. Thus, accurate acquisition of a reception wave may not be possible. In the case of a low vehicle speed range, such a phenomenon remarkably occurs, and thus, an error occurs in recognition accuracy.

In addition, depending on the vehicle speed range of the host vehicle, a slip angle is generated due to deflection of a tire, and thus sideslip occurs. In the dead reckoning of a host vehicle position estimation method, a movement distance and a yaw angle are calculated and sequentially integrated by using sensor information of the host vehicle. Thus, an error occurs between the accuracy of the position of the host vehicle that has skidded and the accuracy of the host vehicle estimation position due to the dead reckoning.

The present invention has been made in view of the above problems, and an object of the present invention is to reduce various errors by notifying a user so as to adjust a vehicle speed to a vehicle speed causing the accuracy of the vehicle sensor and the host vehicle position estimation method to be improved, when surrounding environment information is stored, and controlling the vehicle speed to the vehicle speed causing the accuracy of the vehicle sensor and the host vehicle position estimation method to be improved, when autonomous driving is performed.

Solution to Problem

According to the present invention, a vehicle control device that includes a processor and a memory and controls traveling of a vehicle includes a sensor that acquires surrounding environment information of the vehicle, a host vehicle position estimation unit that estimates a traveling route of the vehicle, a surrounding environment storage unit that stores the surrounding environment information acquired by the sensor and the traveling route estimated by the host vehicle position estimation unit in association with each other, a vehicle-speed threshold determination unit that sets a vehicle-speed threshold value when the surrounding environment storage unit stores the surrounding environment information and the traveling route in association with each other, and determines whether or not a current vehicle speed exceeds the vehicle-speed threshold value when the surrounding environment storage unit stores the surrounding environment information and the traveling route, and a warning unit that performs a notification of an excess of the vehicle speed when the vehicle-speed threshold determination unit determines that the vehicle speed exceeds the vehicle-speed threshold value.

Advantageous Effects of Invention

Thus, according to the present invention, when the surrounding environment information is stored, it is possible to perform a notification so as to obtain a vehicle speed range causing the accuracy of the vehicle sensor and the host vehicle position estimation method to be improved. Further, when driving of the vehicle is assisted, it is possible to set a vehicle speed at which the accuracy of the surrounding environment information and the accuracy of the host vehicle position estimation method are improved.

Objects, configurations, and advantageous effects other than those described above will be clarified by the descriptions of the following embodiments.

DESCRIPTION OF EMBODIMENTS

Figure 1:
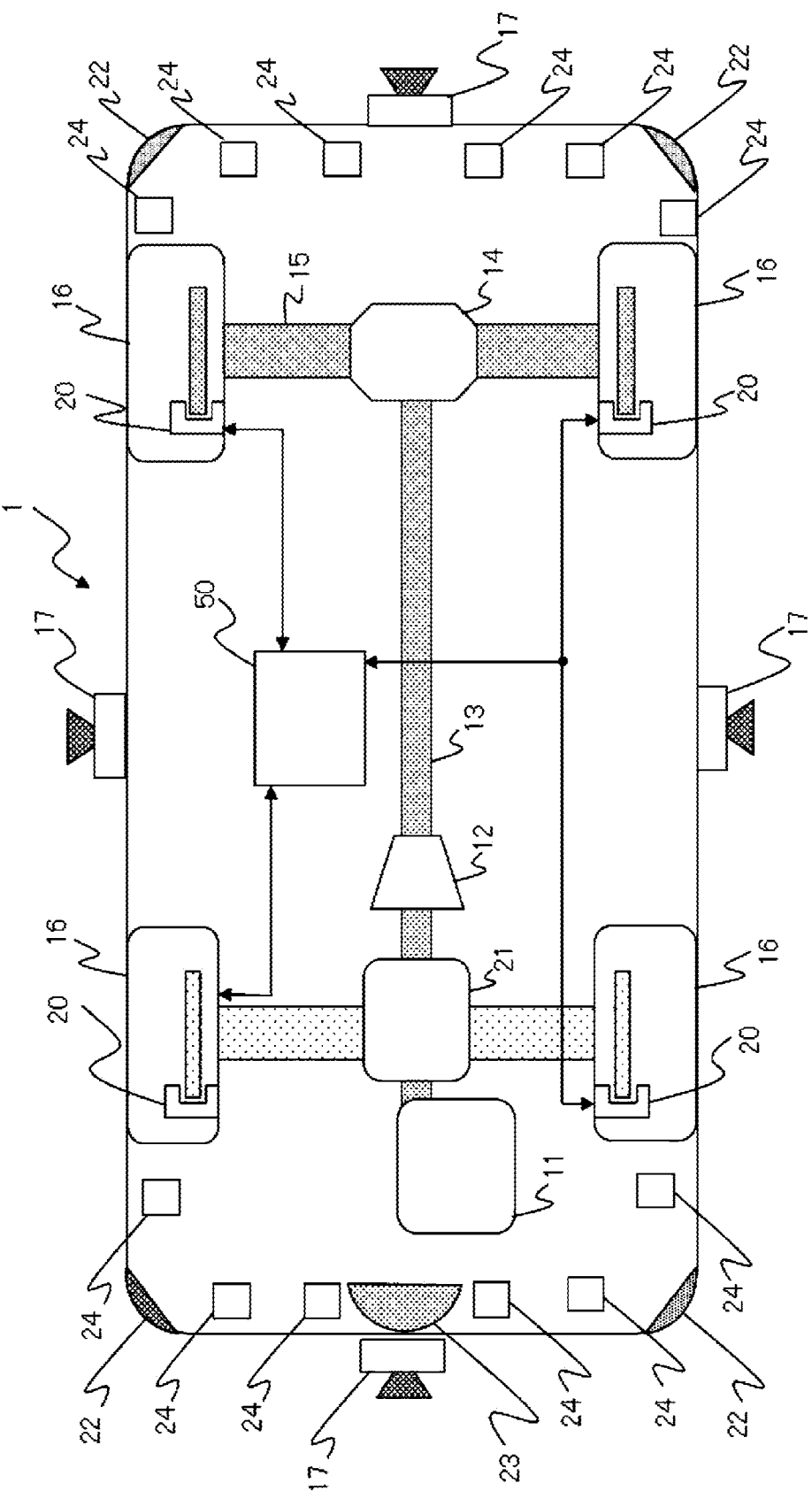
FIG. 1 is a block diagram illustrating an embodiment of the present invention and illustrating an example of a vehicle to which the present invention is applied.

Hereinafter, an embodiment of a vehicle to which a vehicle control device according to the present invention is applied will be described with reference to the drawings. FIG. 1 is a block diagram illustrating a configuration of a vehicle according to the present invention. A vehicle 1 illustrated is a rear-wheel drive vehicle that includes a cylinder injection type gasoline engine 11, for example, as a traveling power source, an automatic transmission 12 that transfers a driving force from the gasoline engine 11, a propeller shaft 13, a differential gear 14, a drive shaft 15, a brake device 20 including four tires 16 and a wheel speed sensor, and an electric power steering 21.

In the vehicle 1, devices, actuators, and instruments including a vehicle control device 50 and various sensors described later transmit and receive signals and data to and from each other through in-vehicle LAN or CAN communication. The vehicle control device 50 acquires information on the outside of the vehicle 1 from sensors described later. The vehicle control device 50 transmits command values for realizing control such as automatic parking (driving assistance) and autonomous driving, to the gasoline engine 11, the brake device 20 including the wheel speed sensor, the electric power steering 21, and the automatic transmission 12. The wheel speed sensor generates a pulse waveform in accordance with the rotation of the wheel, and transmits the pulse waveform to the vehicle control device 50.

A plurality of image pickup sensors 17 and a plurality of short distance measuring sensors 24 are disposed in front of, behind, and on sides of the vehicle 1. In addition, middle distance measuring sensors 22 are disposed in front of and behind the vehicle 1. A long distance measuring sensor 23 is disposed in front of the vehicle. These sensors detect objects around the vehicle 1 and a road environment such as a white line, and supply the road environment to the vehicle control device 50. The mounting positions of these sensors and the number of various sensors are not limited to those in FIG. 1.

The illustrated vehicle 1 is an example of a vehicle to which the present invention can be applied, and the present invention does not limit the configuration of the applicable vehicle. For example, a vehicle adopting a continuously variable transmission (CVT) instead of the automatic transmission 12 may be used. A vehicle including a motor instead of the gasoline engine 11 being the traveling power source or a vehicle including an engine and a motor as the traveling power source may be used.

Figure 2:
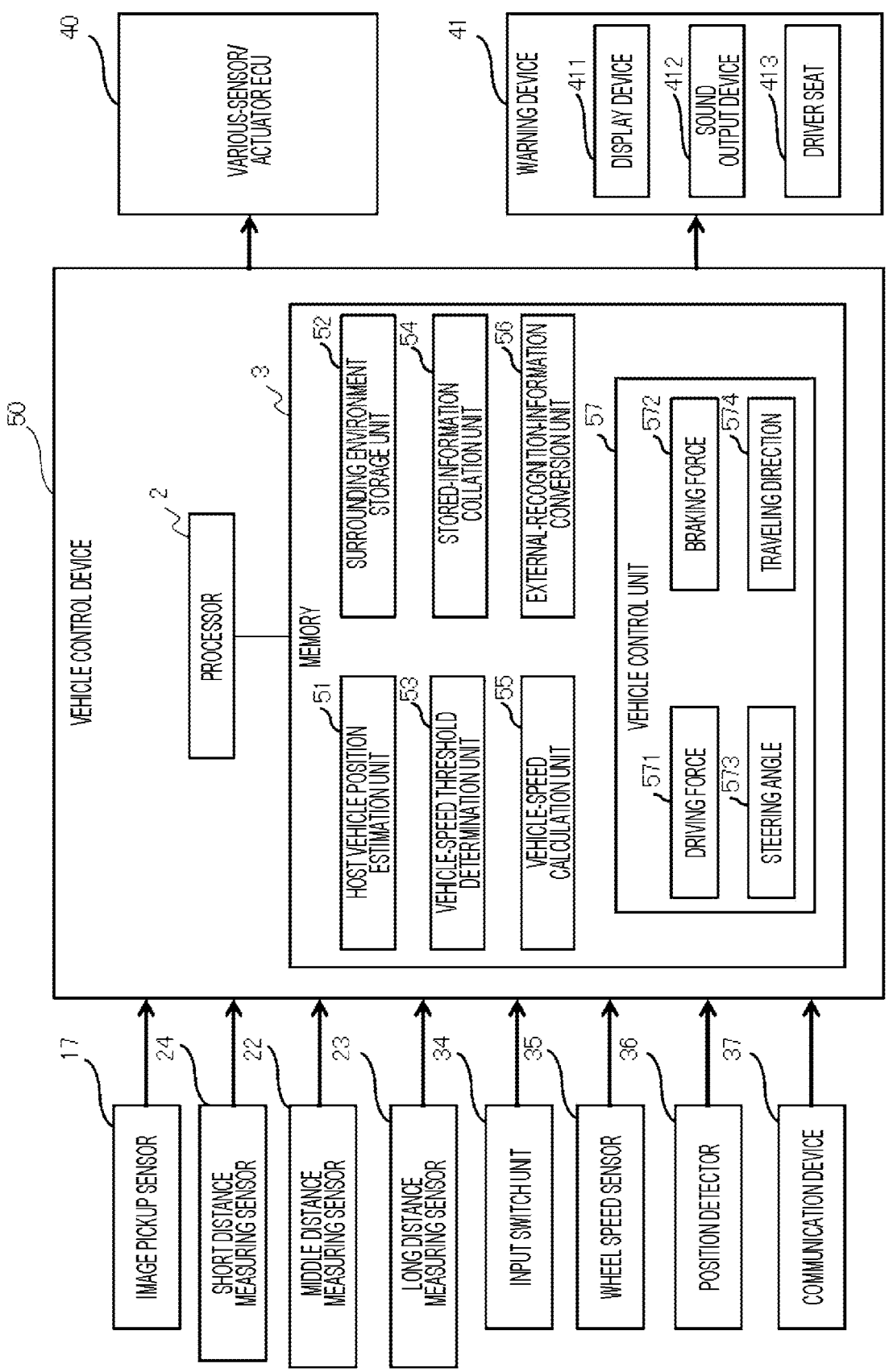
FIG. 2 is a block diagram illustrating the embodiment of the present invention and illustrating an example of functions of a vehicle control device to which the present invention is applied.

FIG. 2 is a functional block diagram of a vehicle control system to which the present invention is applied. The vehicle control system illustrated in FIG. 2 is mounted on the vehicle 1. The vehicle control system includes the image pickup sensor 17, the short distance measuring sensor 24, the middle distance measuring sensor 22, the long distance measuring sensor 23, an input switch unit 34, a wheel speed sensor 35, a position detector 36, a communication device 37, a various-sensor/actuator ECU 40 of the vehicle, a warning device 41, and the vehicle control device 50 connected to these components.

The vehicle control device 50 includes a processor 2 and a memory 3. In the vehicle control device 50, the respective programs of a host vehicle position estimation unit 51, a surrounding environment storage unit 52, a vehicle-speed threshold determination unit 53, a stored-information collation unit 54, a vehicle-speed calculation unit 55, an external-recognition-information conversion unit 56, and a vehicle control unit 57 are loaded into the memory 3 and executed by the processor 2.

The processor 2 executes processing in accordance with a program of each functional unit to run as the functional unit that provides a predetermined function. For example, the processor 2 executes processing in accordance with a host vehicle position estimation program to function as the host vehicle position estimation unit 51. The same applies to other programs. Further, the processor 2 also runs as a functional unit that provides each function in a plurality of pieces of processing executed by the respective programs. A computer and a computer system are a device and a system including such functional units.

The image pickup sensor 17 can be configured by, for example, a camera. The image pickup sensor 17 is used to pick up information of an object, a white line, or a sign by an imaging element attached around the vehicle 1. In the example illustrated in FIG. 2, one camera is used, but a stereo camera having two cameras may be used.

Image pickup data by the image pickup sensor 17 can be synthesized and processed like, for example, an overhead image representing a form viewed from a virtual viewpoint above the vehicle 1 capable of displaying the surroundings of the vehicle 1. The image pickup data by the image pickup sensor 17 is input to the vehicle control device 50.

The short distance measuring sensor 24 can be configured by, for example, a sonar. The short distance measuring sensor 24 is used to detect a distance from an object near the vehicle 1 by transmitting an ultrasonic wave toward the surroundings of the vehicle 1 and receiving the reflected wave. Distance measurement data by the short distance measuring sensor 24 is input to the vehicle control device 50.

The middle distance measuring sensor 22 can be configured by, for example, a millimeter wave radar. The middle distance measuring sensor 22 is used to detect a distance from an object by transmitting a high-frequency wave called a millimeter wave toward the surroundings of the vehicle 1 and receiving the reflected wave. Distance measurement data by the middle distance measuring sensor 22 is input to the vehicle control device 50.

The long distance measuring sensor 23 can be configured by, for example, a millimeter wave radar. The long distance measuring sensor 23 is used to detect a distance from an object by transmitting a high-frequency wave called a millimeter wave toward the front of the vehicle 1 and receiving the reflected wave. The long distance measuring sensor 23 is not limited to a millimeter wave radar, and may be configured by a stereo camera or the like. Distance measurement data by the long distance measuring sensor 23 is input to the vehicle control device 50.

The input switch unit 34 is, for example, a dedicated mechanical switch provided around a driver seat 413. The input switch unit 34 may be a graphical user interface (GUI) switch or the like. The input switch unit 34 receives an instruction to store surrounding environment information or an instruction to automatically control the vehicle, by an operation of a user (driver).

The wheel speed sensor 35 includes a sensor and a controller. The sensor is attached to each wheel of the vehicle 1 and detects a rotation speed of the wheel. The controller generates a vehicle speed signal by integrating detection values detected by the sensors. Vehicle speed signal data from the wheel speed sensor 35 is input to the vehicle control device 50.

The position detector 36 includes an azimuth sensor that measures an azimuth in front of the vehicle 1, a global positioning system (GPS) receiver for a GPS that measures the position of the vehicle based on a radio wave from a satellite, and the like.

The communication device 37 is a device that exchanges communication from the outside. For example, the communication device 37 acquires road surface information (road marking paint type and position such as a lane marker position, a stop line position, and a crosswalk) and object information (object around a road, such as a sign, a traffic light, or a feature), as road information around the vehicle 1. As will be described later, regarding such information, information detected by a sensor installed in the road infrastructure, road surrounding information (road surface information, object information, and the like) stored in an external data center, and road surrounding information (road surface information, object information, and the like) detected by another vehicle can also be acquired by using the communication device 37. Furthermore, the road surrounding information stored in advance can be changed to the latest information by using the communication device 37.

The various-sensor/actuator ECU 40 may be known or well-known, and includes, for example, a power steering ECU and a brake ECU.

The vehicle control unit 57 includes, as control targets, a driving force 571, a braking force 572, a steering angle 573 for controlling a course of the vehicle 1, a traveling direction 574 of the vehicle 1, and the like.

The warning device 41 notifies the user of an excess of the vehicle speed determined by the vehicle-speed threshold determination unit 53 described later. For example, the user is notified of the excess of the speed by using a display device 411 such as a liquid crystal display, a sound output device 412 such as a speaker, the driver seat 413 including a vibrator, or the like.

The host vehicle position estimation unit 51 calculates and estimates the position where the vehicle 1 travels, from information output by the position detector 36 and the wheel speed sensor 35, for example.

The vehicle-speed calculation unit 55 detects the traveling speed of the vehicle 1 from a signal output from the wheel speed sensor 35, and outputs a vehicle speed signal indicating the detected traveling speed to the vehicle control device 50.

When the surrounding environment information is stored, the vehicle-speed threshold determination unit 53 determines whether or not the vehicle speed controlled by the user exceeds an upper limit value of the vehicle speed predetermined by the vehicle control device 50.

The external-recognition-information conversion unit 56 converts the surrounding environment information acquired when the vehicle travels by manual driving, by using the image pickup sensor 17, the short distance measuring sensor 24, the middle distance measuring sensor 22, and the long distance measuring sensor 23, and the positional relation of the vehicle 1 output from the host vehicle position estimation unit 51 into a predetermined coordinate system.

The surrounding environment storage unit 52 stores the surrounding environment information transformed into the predetermined coordinate system by the external-recognition-information conversion unit 56 and data obtained by transforming the positional (traveling route) relation of the vehicle 1 into the predetermined coordinate system. The host vehicle position estimation unit 51 estimates the position of the host vehicle at a predetermined cycle. The surrounding environment storage unit 52 stores data obtained by connecting the estimated positions in time series as a traveling route.

Position information of the vehicle 1 of the host vehicle position estimation unit 51 corresponding to the surrounding environment information stored in the surrounding environment storage unit 52 is input to the stored-information collation unit 54. The stored-information collation unit 54 collates information of the surrounding environment of the vehicle 1 detected by various sensors mounted on the vehicle 1 with the stored information, and calculates and compares the feature amount whether the target object corresponding to the stored information coincides.

The stored-information collation unit 54 calculates and compares the feature amount of the target object stored in the surrounding environment storage unit 52 and the feature amount of the detected target object in the surrounding environment of vehicle 1. A known or well-known method may be applied to the calculation of the feature amount.

When the degree of the feature amounts coinciding with each other is high, the stored-information collation unit 54 transitions to a low-speed autonomous driving possible state. When the degree of the feature amounts coinciding with each other is low, the stored-information collation unit 54 transitions to a low-speed autonomous driving impossible state.

The vehicle control unit 57 calculates target values for controlling the various-sensor/actuator ECU 40 when performing the low-speed autonomous driving, and outputs a control instruction. The target values calculated by the vehicle control unit 57 include the driving force 571, the braking force 572, the steering angle 573, and the traveling direction 574.

Figure 3:
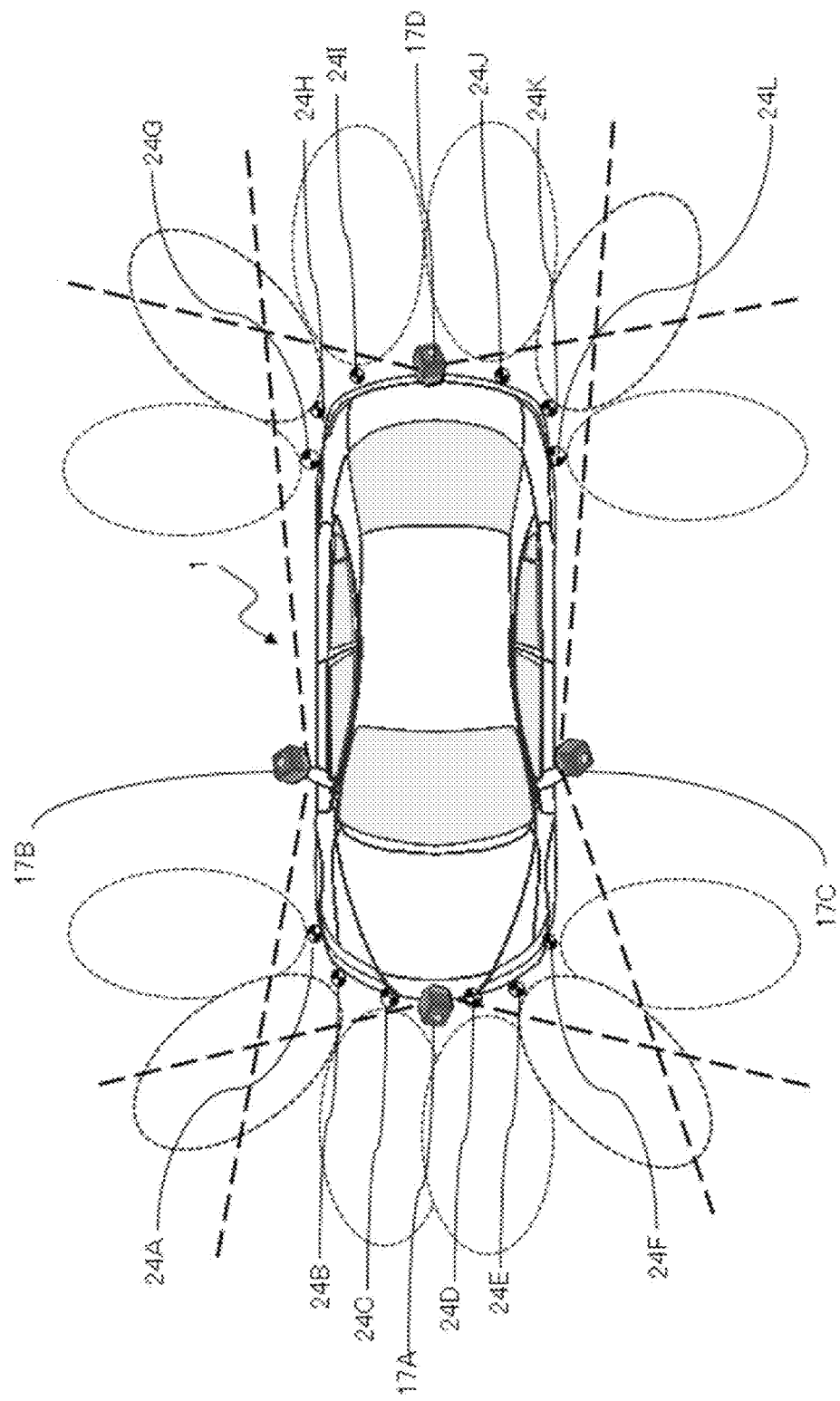
FIG. 3 is a diagram illustrating the embodiment of the present invention and illustrating an example of a recognition region by an image pickup sensor and a short distance measuring sensor mounted on the vehicle.

FIG. 3 is a diagram illustrating an example of arrangement and detection ranges of the short distance measuring sensors 24A to 24L and the image pickup sensors 17A to 17D mounted on the front portion, the side portion, and the rear portion of the vehicle 1.

As illustrated in FIG. 3, six short distance measuring sensors 24A, 24B, 24C, 24D, 24E, and 24F in total are disposed in front of the vehicle 1, and six short distance measuring sensors 24G, 24H, 24I, 24J, 24K, and 24L in total are disposed behind the vehicle 1. An ellipse indicated by a dotted line in FIG. 3 indicates an example of a detection range of each of the short distance measuring sensors 24A to 24L.

As illustrated in FIG. 3, the image pickup sensor 17A is attached to the front of the vehicle 1. The image pickup sensors 17B and 17C are attached to the left and right of the vehicle 1. The image pickup sensor 17D is attached to the rear of the vehicle 1.

A straight broken line illustrated in FIG. 3 indicates an example of a detection range of each of the image pickup sensors 17A to 17D. By converting and combining images picked up by the four image pickup sensors 17A to 17D, it is possible to generate an overhead view of the vehicle 1 and the surroundings of the vehicle 1 viewed from above. The overhead view is used for display on a liquid crystal display (display device 411) or the like.

Figure 4:
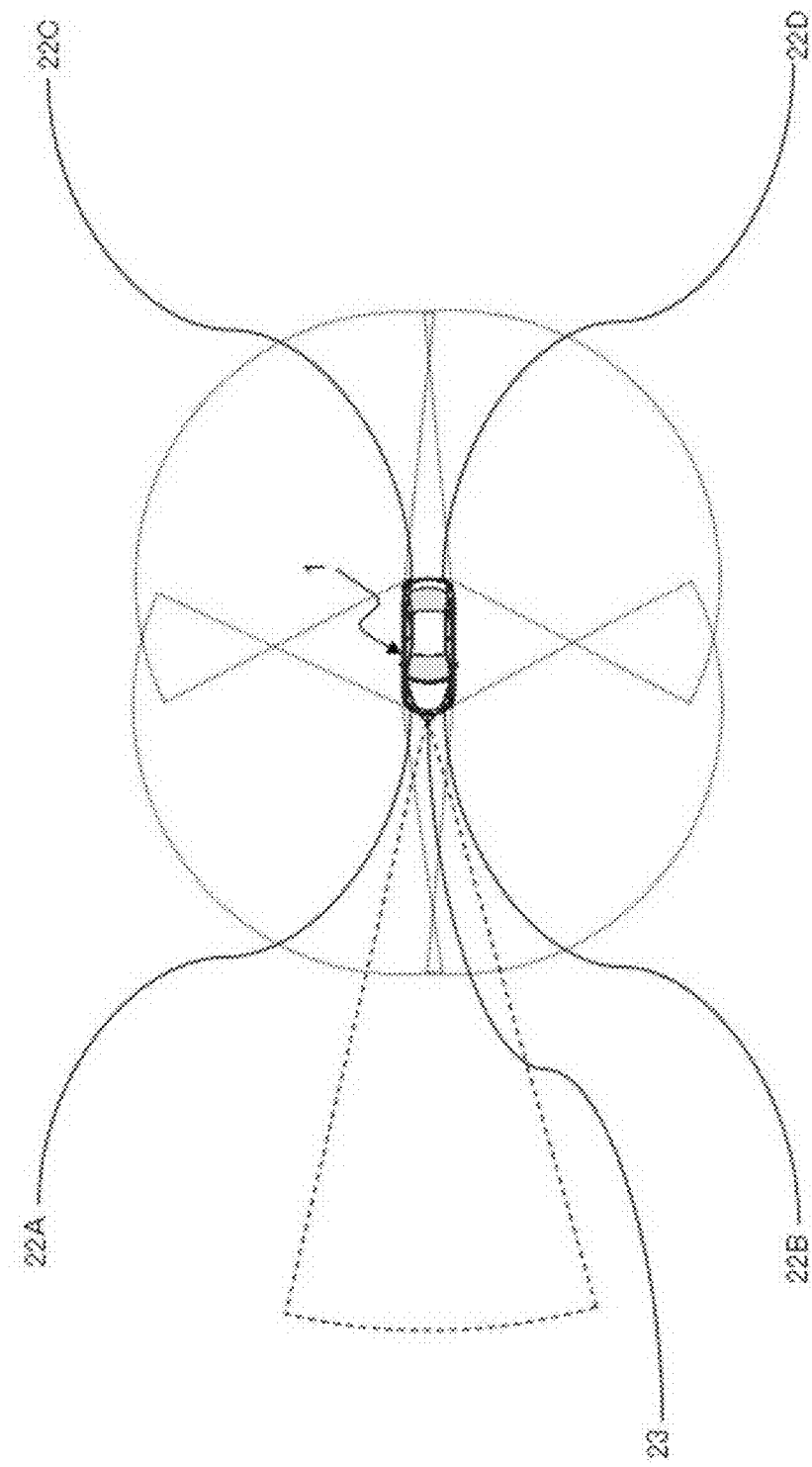
FIG. 4 is a diagram illustrating the embodiment of the present invention and illustrating an example of a recognition region by a middle distance measuring sensor and a long distance measuring sensor mounted on the vehicle.

FIG. 4 is a diagram illustrating an example of the arrangement and detection ranges of the middle distance measuring sensors 22A to 22D mounted on the front portion and the rear portion of the vehicle 1 and the long distance measuring sensor 23 mounted on the front portion of the vehicle 1.

As illustrated in FIG. 4, the middle distance measuring sensors 22A to 22B are disposed in the front portion of the vehicle 1, and the middle distance measuring sensors 22C to 22D are disposed in the rear portion of the vehicle 1. A fan shape indicated by a dotted line in FIG. 3 indicates an example of a detection range of each of the middle distance measuring sensors 22A to 22D.

As illustrated in FIG. 4, the long distance measuring sensor 23 is disposed in the front portion of the vehicle 1. A fan shape indicated by a broken line in FIG. 4 indicates an example of a detection range of the long distance measuring sensor 23.

Figure 5:
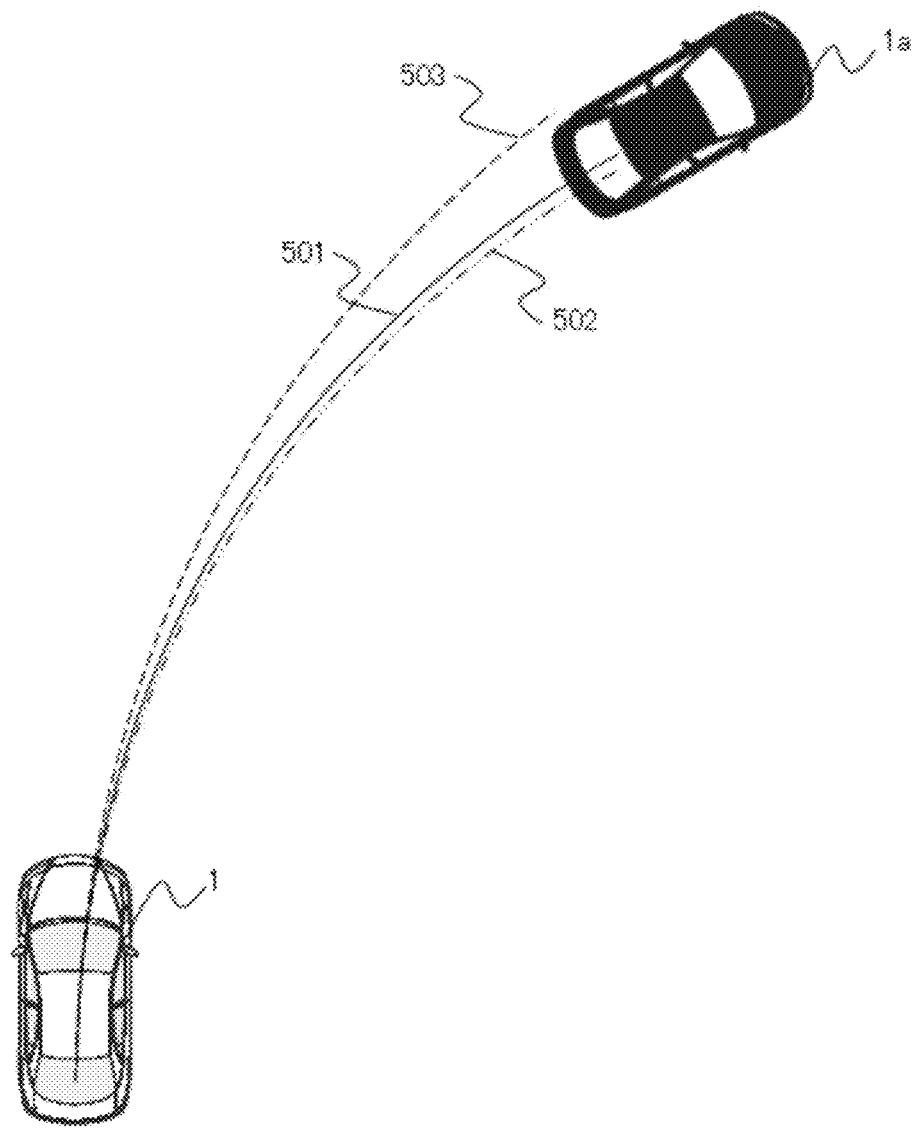
FIG. 5 is a diagram illustrating the embodiment of the present invention and illustrating an example of a mechanism in which an error occurs between a host vehicle estimation position and an actual vehicle position during circle turning, depending on a vehicle speed range.

FIG. 5 is a diagram illustrating a movement trajectory of the vehicle 1 by a change in a vehicle speed range when the vehicle travels in a steady circle. FIG. 5 illustrates a vehicle 1a at a position after the vehicle 1 travels by a certain distance. A solid line indicates a target route trajectory 501. A long two-dot chain line indicates a trajectory 502 during low-speed traveling. A long broken line indicates a trajectory 503 during high-speed traveling.

In FIG. 5, the deflection of the tire 16 hardly occurs during the low-speed traveling, and thus the vehicle can track the target route trajectory 501. However, the deflection of the tire 16 occurs during the high-speed traveling, and thus, even though the steering angle is the same, it is not possible for the vehicle to track the target route trajectory 501, and an error occurs. Although the target route trajectory 501 and the trajectory 502 during the low-speed traveling coincide with each other, the trajectories 501 and 502 are shifted in terms of notation in FIG. 5.

Figure 6:
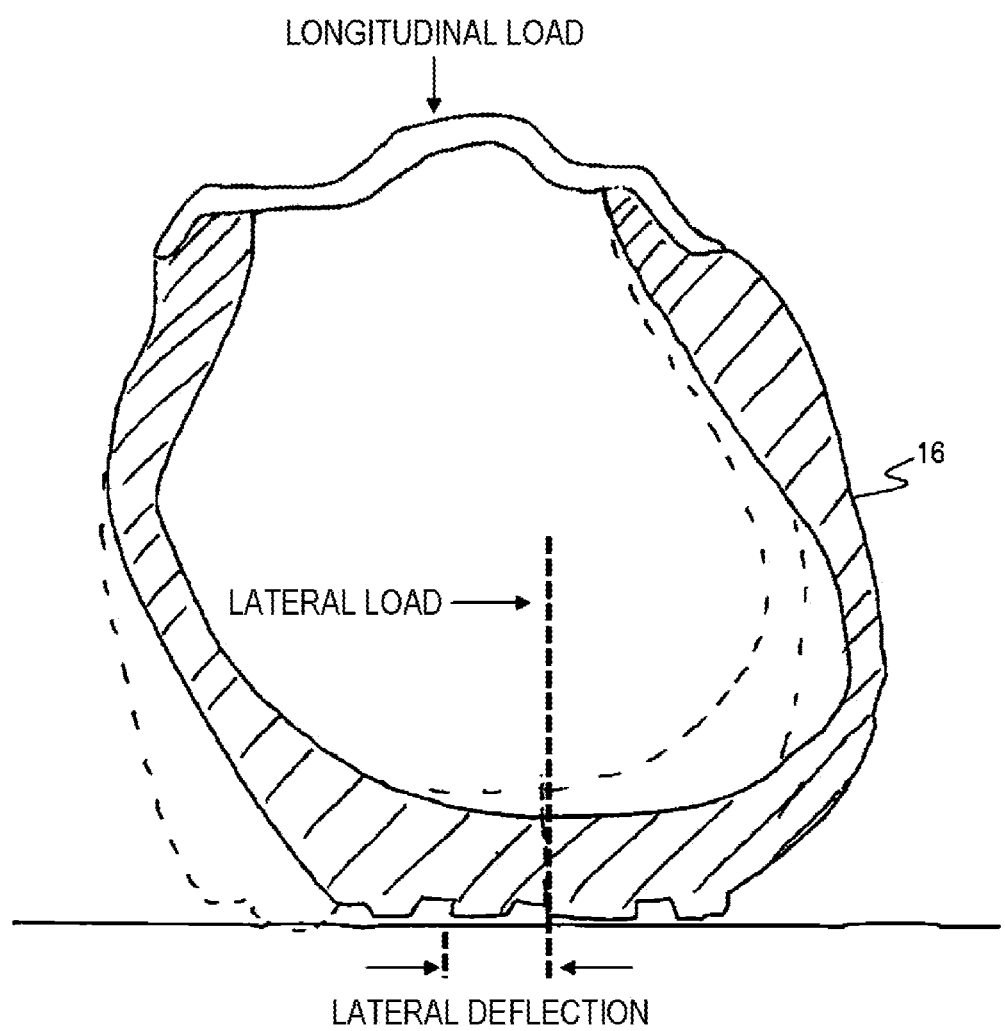
FIG. 6 is a diagram illustrating the embodiment of the present invention and illustrating an example of a mechanism in which deflection of a tire occurs.

FIG. 6 is a diagram illustrating a deflection change of the tire 16. The tire 16 is deflected by a frictional force generated by a contact with a road surface and a lateral force (lateral load in FIG. 6) during turning. The larger the load, the larger the deflection amount. During the high-speed traveling illustrated in FIG. 5, the load on the tire 16 increases, so that the deflection occurs, it is not possible for the vehicle to track the target route trajectory 501, and an error occurs.

Figure 7:
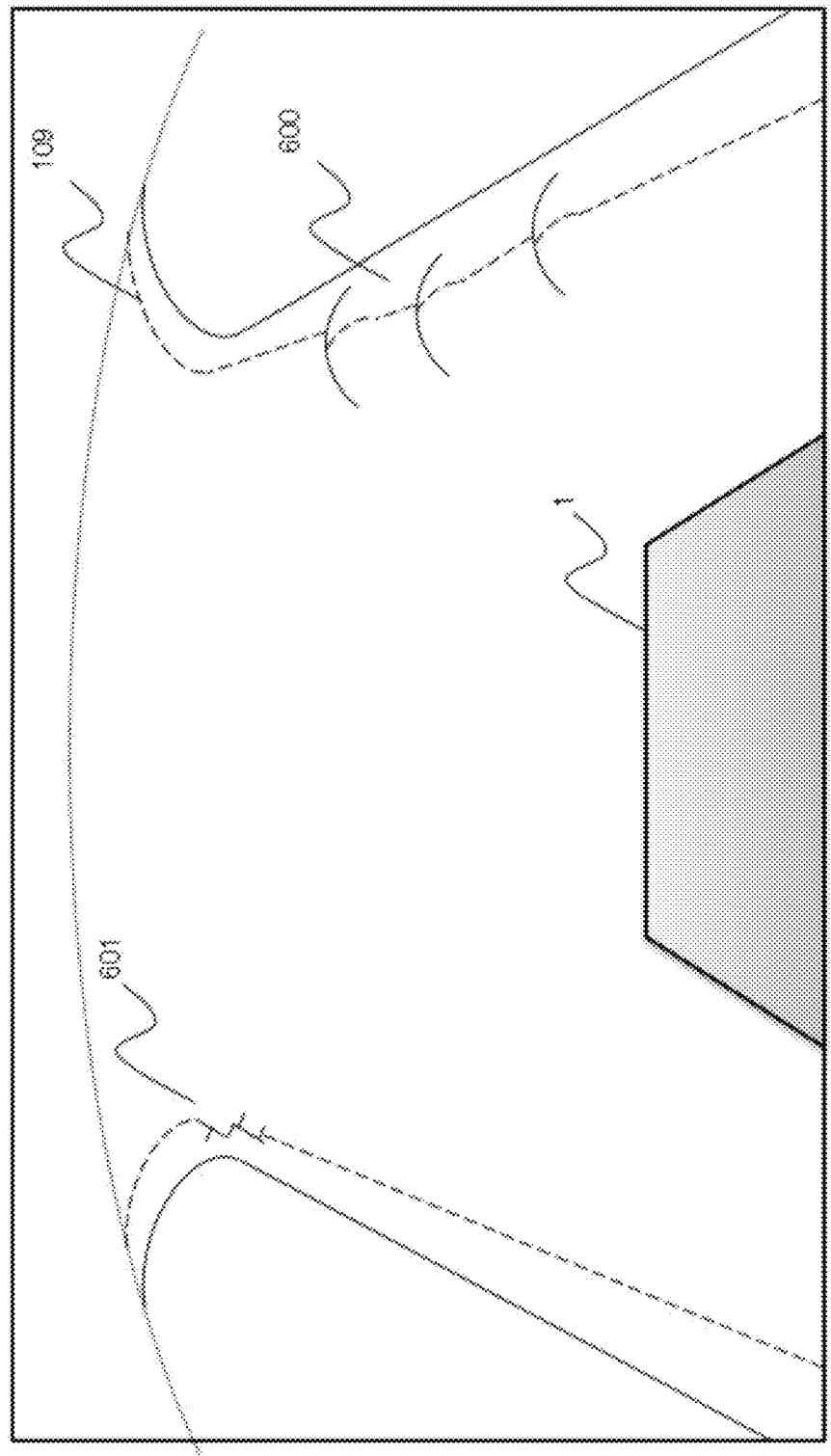
FIG. 7 is a diagram illustrating the embodiment of the present invention and illustrating an example of a mechanism in which an error occurs in recognition accuracy due to a crack or unevenness of a road surface.

FIG. 7 illustrates an example in which a crack or unevenness of the road surface is provided in the surrounding environment information. As the surrounding environment information of the vehicle 1, there are a white line 109, a crack 601, and road-surface unevenness 600. A sonar or a millimeter wave radar transmits an ultrasonic wave or a millimeter wave to an object, and measures a distance based on a time when a reflected wave hitting the object is received. However, in the case of a crack or unevenness of a road surface, a reflected wave bouncing back is irregularly reflected, and thus it is not possible to accurately acquire a reception wave. In the case of a low vehicle speed range, such a phenomenon remarkably occurs, and thus, an error occurs in recognition accuracy.

FIGS. 8, 9, 10, and 11 are explanatory diagrams regarding a case where environment information on the surroundings of the vehicle 1 is stored by manual driving and the vehicle 1 autonomously travels to a target position by using the stored surrounding environment information, as an example of a travel scene regarding a travel control system in the present embodiment. Here, the target position indicates a parking position, a stop position, and the like. The target position may be set in advance from an input device such as the input switch unit 34. Alternatively, in the case of the display device 411 including a touch panel, the target position may be set by displaying map information on a screen.

Figure 8:
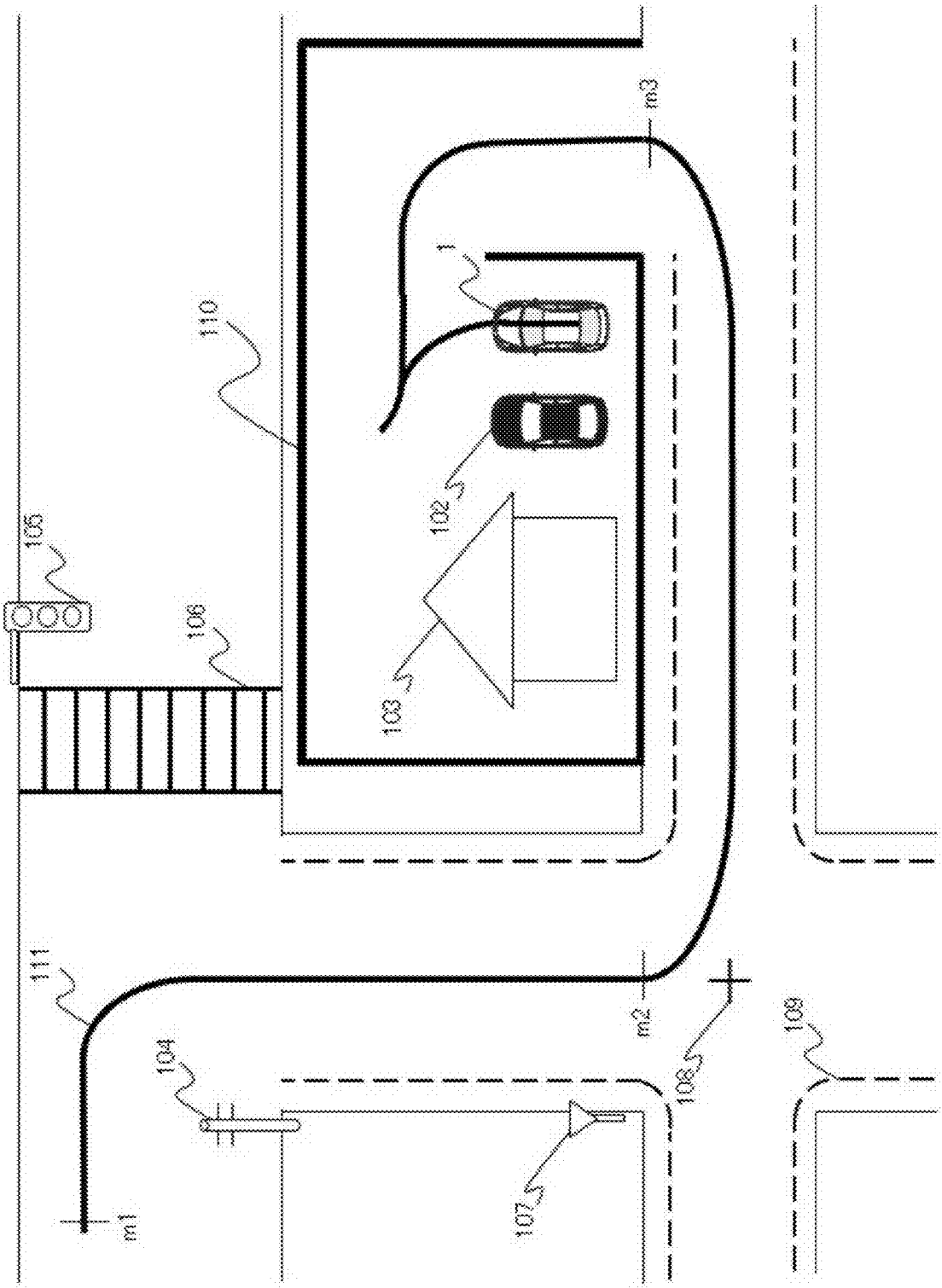
FIG. 8 is a diagram illustrating the embodiment of the present invention and illustrating an example of a surrounding environment of a vehicle.

FIG. 8 is a diagram illustrating an example of the surrounding environment information of the vehicle 1. As the surrounding environment information of the vehicle 1, there are a utility pole 104, a traffic light 105, a crosswalk 106, a sign 107, a road marking paint 108, a white line 109, and the like present beside the road. In addition, another vehicle 102, an outer wall 110, and the like are present around a house 103. In addition, the surrounding environment information may include the above-described road surrounding information (road surface information and object information).

Points m1, m2, and m3 in FIG. 8 indicate points where the speed of the vehicle 1 is changed in FIG. 13 described later.

Figure 12:
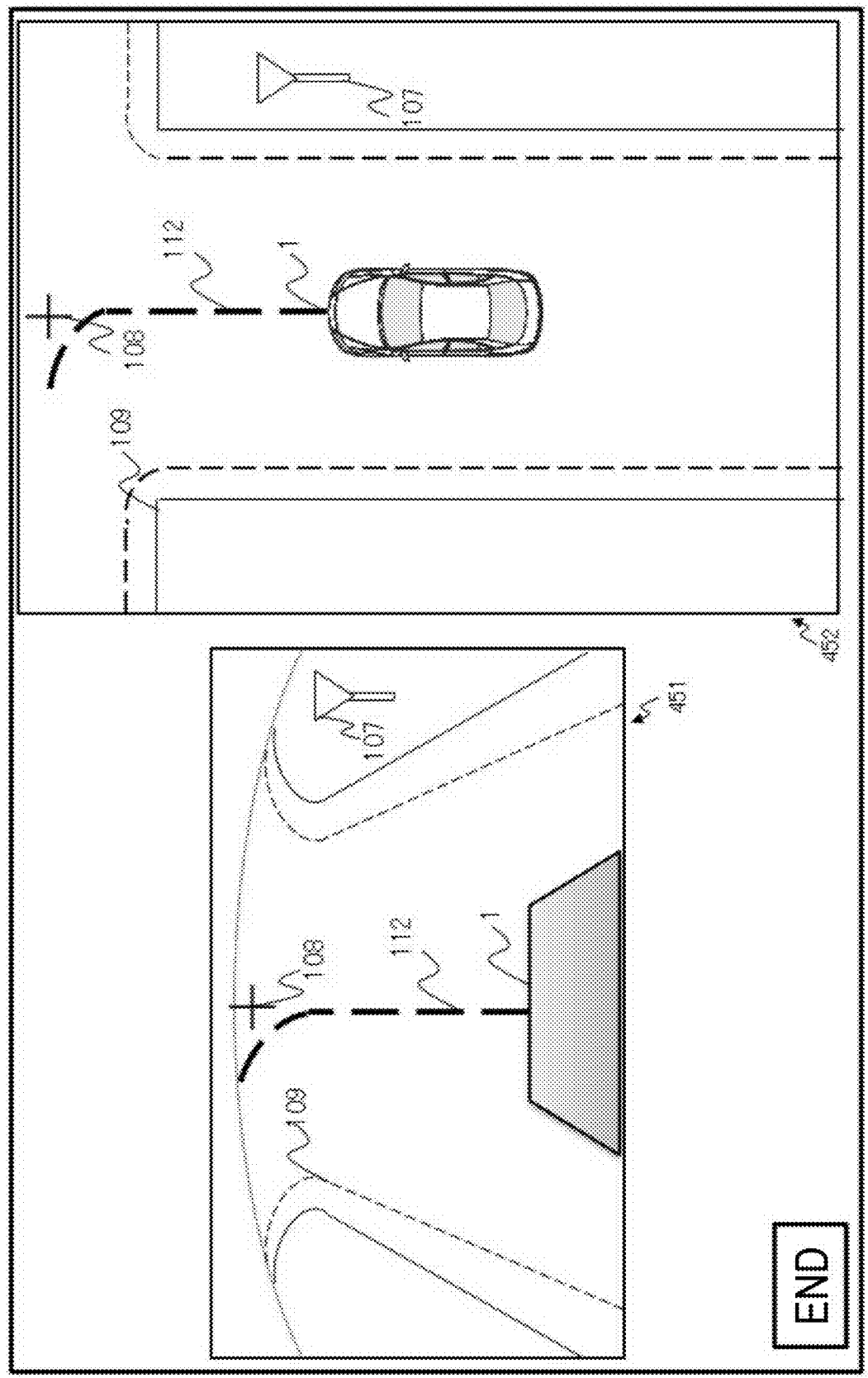
FIG. 12 is a diagram illustrating the embodiment of the present invention and illustrating an example of a screen display output to the display device when autonomous driving is performed to the target position by using the stored surrounding environment information.

As information necessary for autonomous traveling of the vehicle 1, FIG. 8 illustrates a route 111 during manual driving, and FIG. 12 illustrates a target route 112 during autonomous driving.

A moving object around the vehicle 1 changes from moment to moment, but in general, the road marking paint 108, the sign 107 around the road, the traffic light 105, and the like are considered to be target objects that normally exist so long as the target objects are not updated or modified. The positions of the road marking paint 108, the sign 107, and the traffic light 105, which are such target objects that normally exist, are stored in the surrounding environment storage unit 52, as information on the map.

Figure 9:
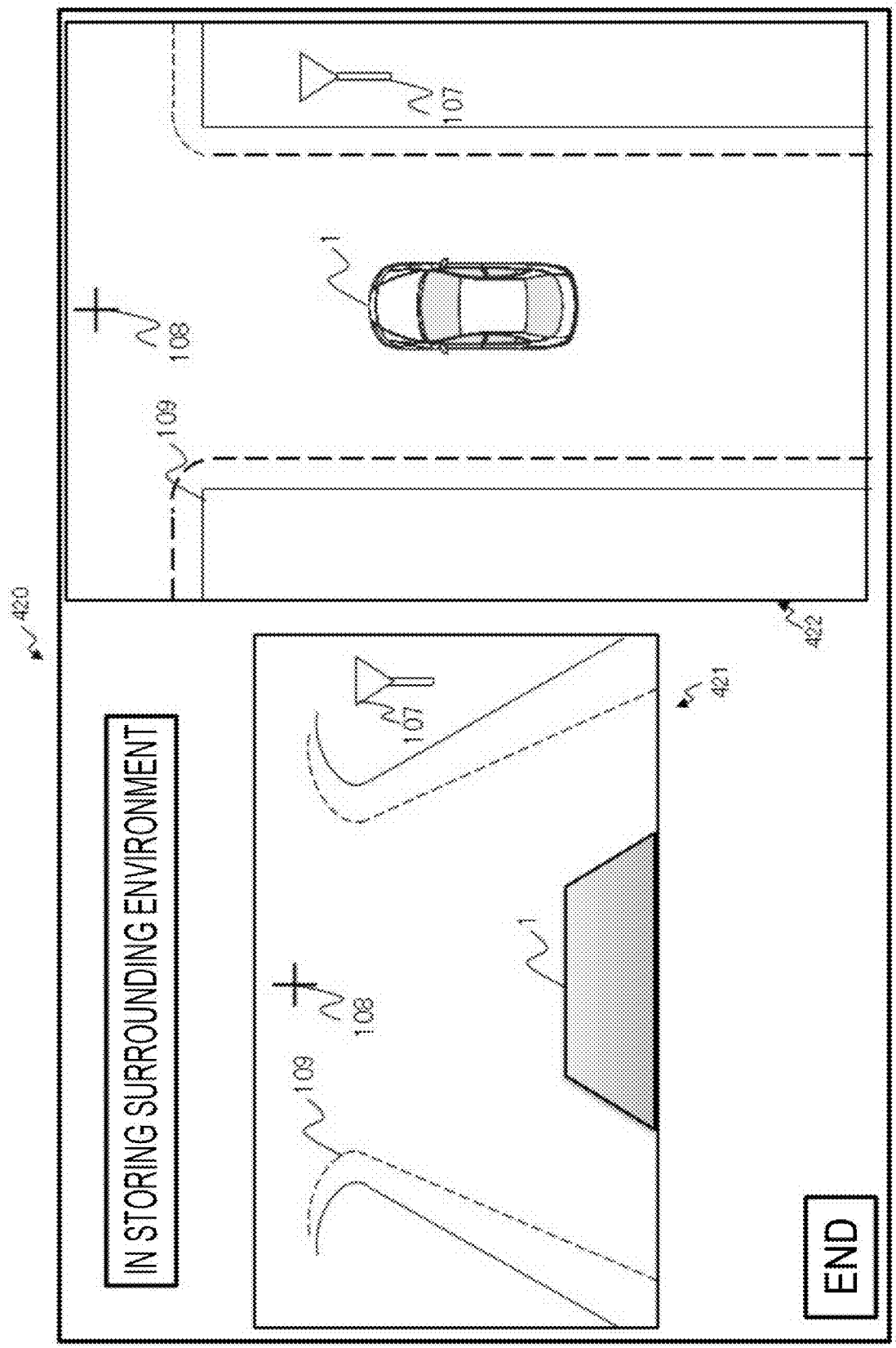
FIG. 9 is a diagram illustrating the embodiment of the present invention and illustrating an example of a screen output to a display device when surrounding environment information of a vehicle is stored.

FIG. 9 is a diagram illustrating a display example of a screen 420 in which the surrounding environment information is being stored when the surrounding environment information is stored by manual driving. FIG. 9 illustrates an example of the screen 420 displayed on the display device 411.

The screen 420 includes a window 421 for displaying an image of the front of the vehicle 1 picked up by the image pickup sensor 17A, and a window 422 for displaying an image of the vehicle 1 viewed from above, which is obtained by combining images picked up by the image pickup sensors 17A to 17D.

Figure 14:
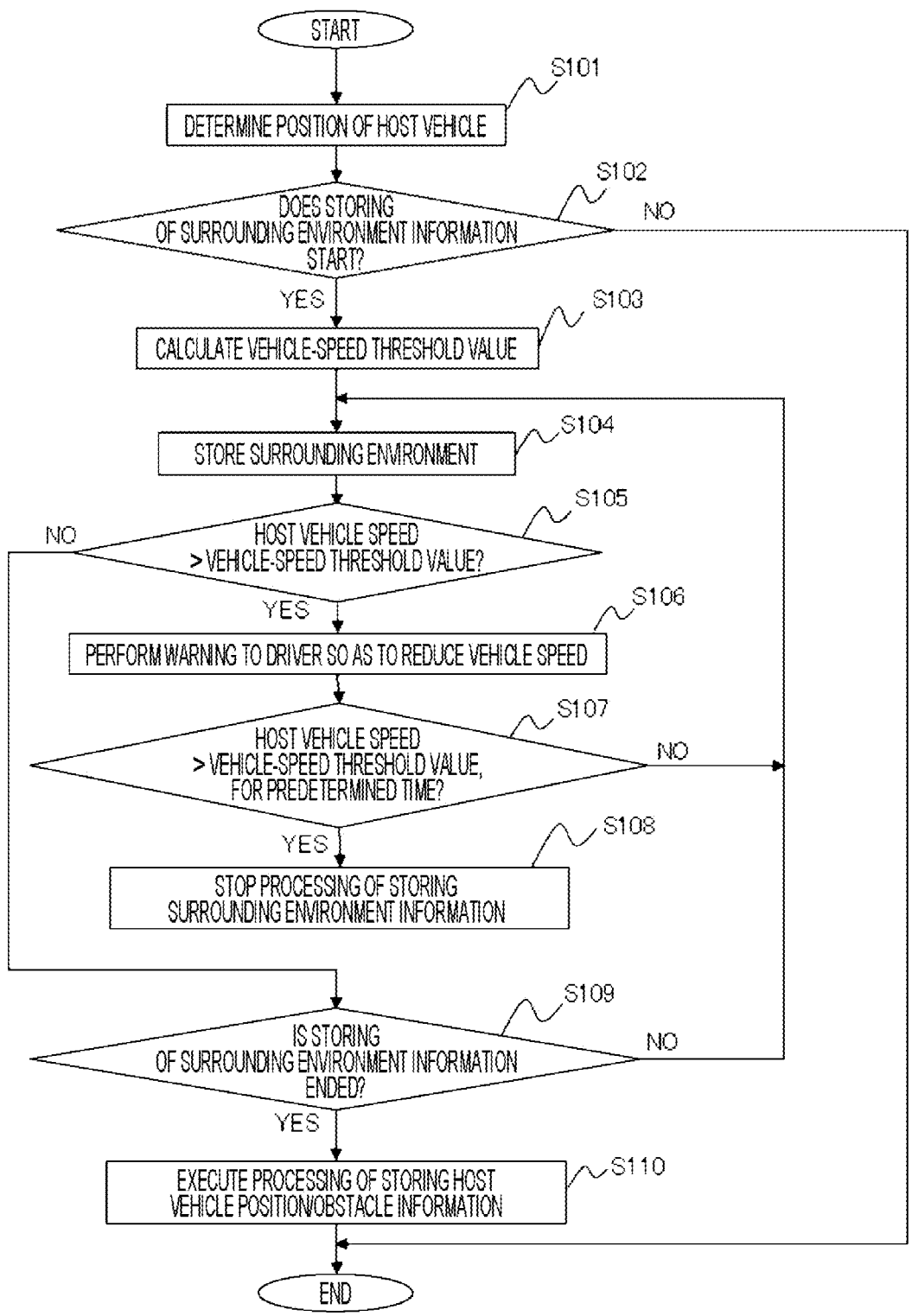
FIG. 14 is a flowchart illustrating the embodiment of the present invention and illustrating an example of processing performed by the vehicle control device during the manual driving.

In the flowchart of FIG. 14 described later, the screen 420 in FIG. 9 shows processing contents of Step S104.

Figure 10:
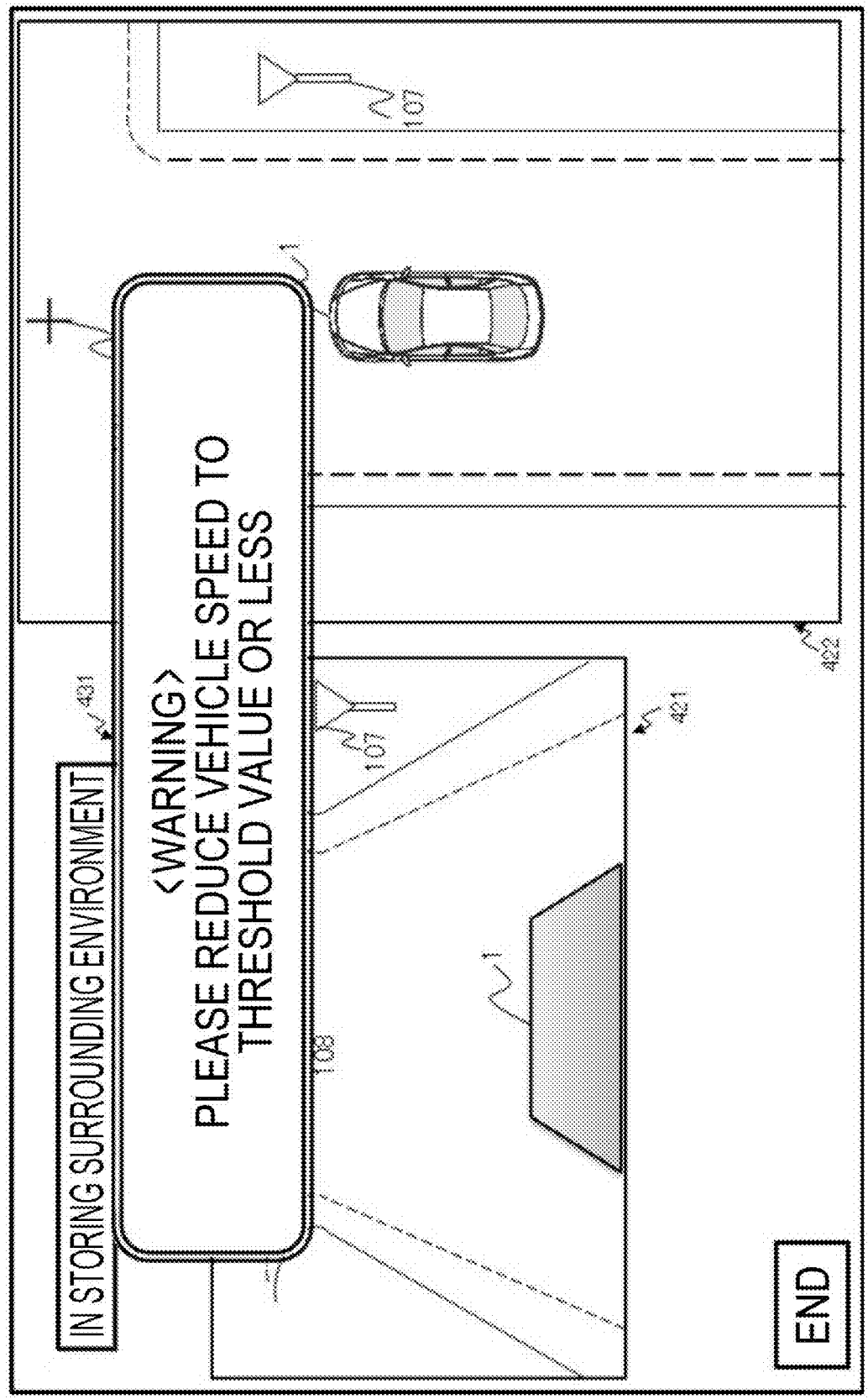
FIG. 10 is a diagram illustrating the embodiment of the present invention and illustrating an example of a screen display in a case where a vehicle speed exceeds a vehicle-speed threshold value when a vehicle travels to a target position by manual driving.

FIG. 10 is a diagram illustrating a display example of the screen 420 for giving a notification to reduce the vehicle speed in a case where the speed of the vehicle 1 exceeds a vehicle-speed threshold value when the surrounding environment information is stored during the manual driving. In the flowchart of FIG. 14 described later, the screen 420 of FIG. 10 shows processing contents of Step S106.

FIG. 10 illustrates an example in which a warning 431 for reducing the vehicle speed is displayed on the screen 420 displayed on the display device 411. The warning 431 is displayed across the two windows 421 and 422.

Figure 11:
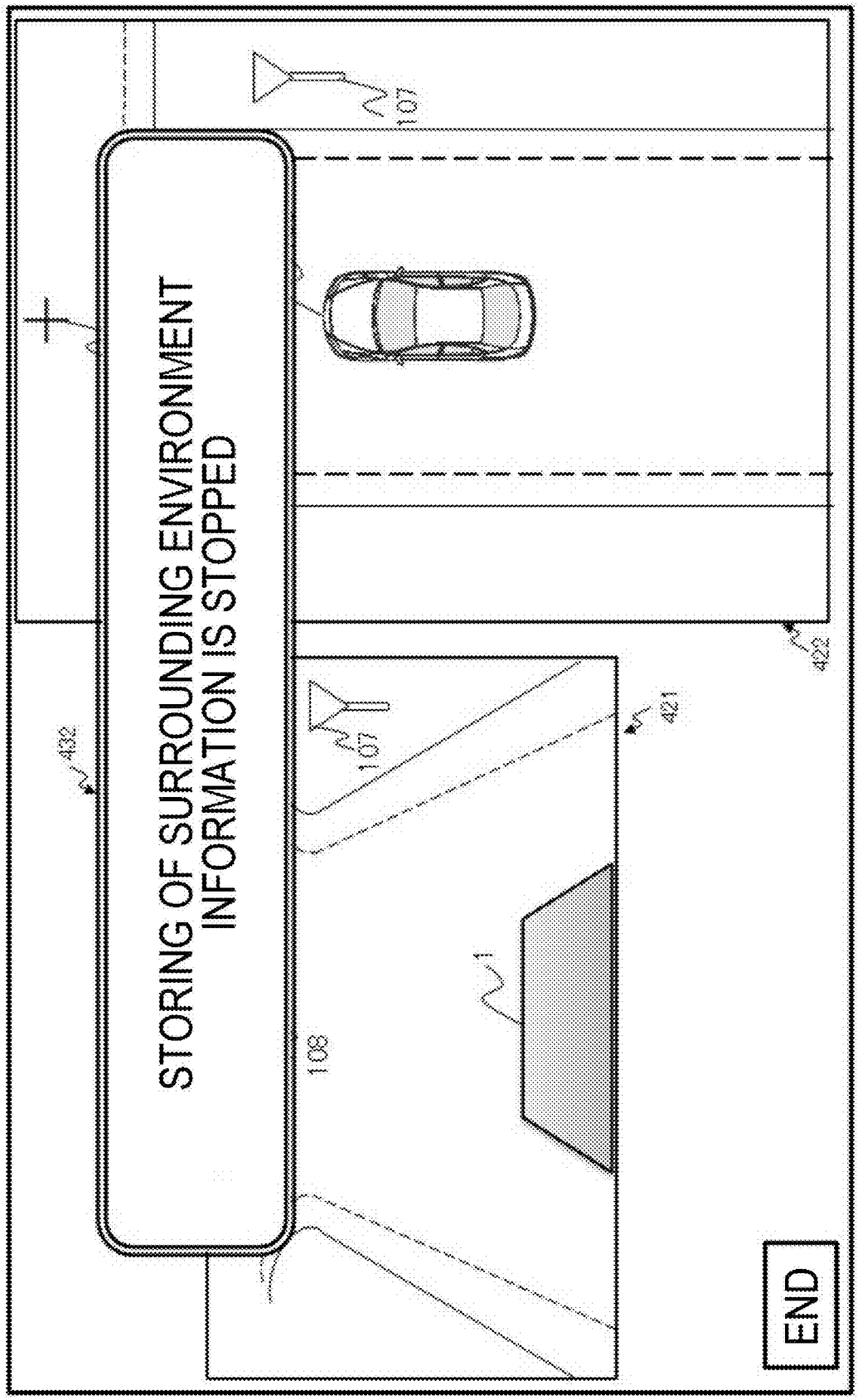
FIG. 11 is a diagram illustrating the embodiment of the present invention and illustrating an example of a screen display in a case where the vehicle speed exceeds the vehicle-speed threshold value for a predetermined time when the surrounding environment information of a vehicle is stored.

FIG. 11 is a diagram illustrating a display example of the screen 420 for stopping of the surrounding environment information in a case where a period during which the speed of the vehicle 1 exceeds the vehicle-speed threshold value exceeds a predetermined time when the surrounding environment information is stored during manual driving. In the flowchart of FIG. 14 described later, the screen 420 of FIG. 11 shows processing contents of Step S108.

FIG. 11 illustrates an example in which a notification 432 to stop storing of the surrounding environment information is displayed on the screen 420 displayed on the display device 411. The notification 432 is displayed across the two windows 421 and 422.

Figure 15:
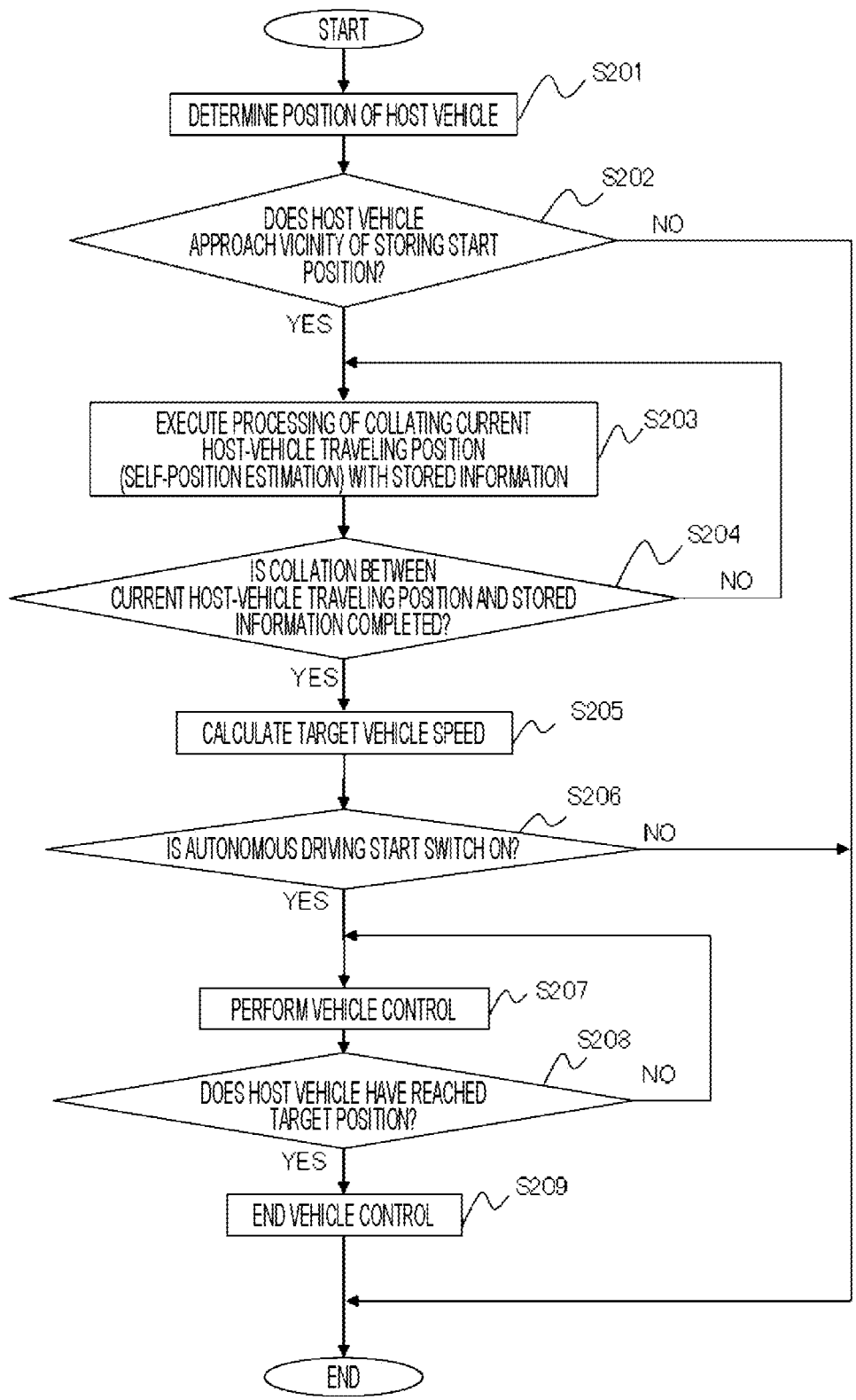
FIG. 15 is a flowchart illustrating the embodiment of the present invention and illustrating an example of processing performed by the vehicle control device during the autonomous driving.

FIG. 12 is a diagram illustrating a display example of a screen 440 for performing autonomous driving by using the stored surrounding environment information. In the flowchart of FIG. 15 described later, the screen 440 of FIG. 12 shows processing contents of Step S207.

In FIG. 12, the screen 440 for the autonomous driving, which is displayed on the display device 411, includes a window 451 and a window 452. On the window 451, an image of the front of the vehicle 1, which is picked up by the image pickup sensor 17A, and the target route 112 are displayed. On the window 452, an image of the vehicle 1 viewed from above, which is obtained by combining objects detected from the images picked up by the image pickup sensors 17A to 17D and the target route 112, is displayed.

Figure 13:
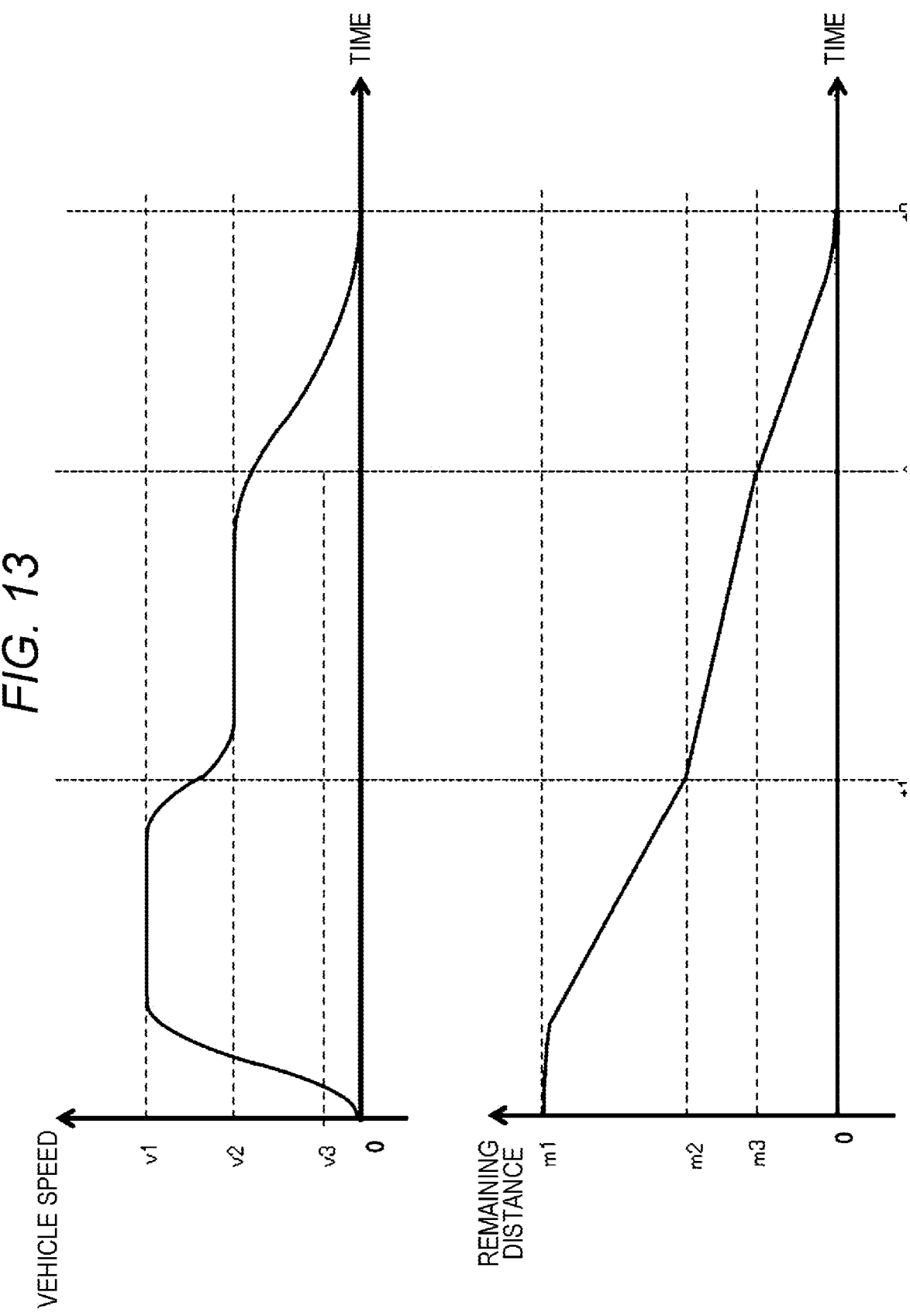
FIG. 13 is a graph illustrating the embodiment of the present invention and illustrating a relation between the vehicle speed, a remaining distance, and a time at a point where the vehicle speed is changed on a traveling route.

FIG. 13 is a graph illustrating a relation between a vehicle speed, a remaining distance, and a time point at the points (m1 to m3) where the speed of the vehicle 1 is changed in FIG. 8 described above. Here, the remaining distance indicates the remaining travel distance from a start position to a target position.

In FIG. 13, a vehicle-speed threshold value v1 is an upper limit value of the vehicle speed allowing recognition accuracy of the surrounding environment information and estimation accuracy of the host vehicle position to be secured. A vehicle-speed threshold value v2 in FIG. 13 indicates a value that reduces the vehicle speed of the vehicle 1 from the vehicle-speed threshold value v1 as the vehicle approaches a landmark (predetermined object or white line) in the surrounding environment information. A vehicle-speed threshold value v3 in FIG. 13 indicates a lower limit value of the vehicle speed of the vehicle 1, which is hardly influenced by a crack or unevenness of the road surface. The relation between the vehicle-speed threshold value and the vehicle speed lower limit value is $v1 > v2 > v3$.

When the vehicle speed is reduced, the rate of the pulse detected by the wheel speed sensor 35 is also reduced, and the accuracy of the trajectory (position of the vehicle) of the traveling route calculated based on the pulse is reduced.

Therefore, when the surrounding environment information is detected, the vehicle speed lower limit value v3 is set in advance as a range in which the accuracy of the vehicle speed is not reduced.

A point m1 indicates a storing start point. A point m2 indicates a point where the host vehicle speed reduces as the vehicle approaches a predetermined landmark in the surrounding environment information. A point m3 indicates a point where the host vehicle speed reduces as the vehicle approaches a target position.

A time point t1 indicates a time point at which the vehicle passes through a point close to the landmark. A time point t2 indicates a time point at which the vehicle passes through a point close to the target position. A time point t3 indicates a time point at which the vehicle has reached the target position.

From FIG. 13, the vehicle-speed threshold value v1 of the vehicle 1 is increased to the upper limit value from the vicinity of the point m1 as the storing start point to the point m2 where the landmark is recognized. When the vehicle approaches the point m2 near the landmark, the vehicle speed is reduced to the vehicle-speed threshold value v2 at which the recognition accuracy of the sensor is improved. At the point m3 close to the vicinity of the target position, the limit of the vehicle speed lower limit value v3 is released, and automatic parking is performed. The vehicle speed is limited not to fall below the vehicle speed lower limit value v3 up to the point m3.

As described above, the vehicle control device 50 gradually reduces the vehicle-speed threshold value as approaching the target position, so as to reliably recognize the surrounding environment information, secure the estimation accuracy of the position of the vehicle 1, and secure the control accuracy during autonomous driving.

FIG. 14 is a flowchart illustrating processing executed by the vehicle control device 50 when the user performs manual driving and causes the vehicle control device 50 to store surrounding environment information.

In Step S101, the vehicle control device 50 acquires an estimated value of the current position of the vehicle 1 from the host vehicle position estimation unit 51, and determines the position of the vehicle 1. Here, by determining the position of the vehicle 1, a point where storing of the surrounding environment information in the surrounding environment storage unit 52 is started is specified. In this step, as a method of specifying the position of the vehicle 1, a method of specifying the approximate position of the vehicle 1 by using GPS information of the position detector 36 may be used.

In Step S102, the vehicle control device 50 determines whether or not an operation to start storing of the surrounding environment information has been detected by the user. Regarding a determination method, such determination can be performed by detecting whether or not the vehicle control device 50 has operated the predetermined input switch unit 34. When the operation to start storing of the surrounding environment information is detected, the processing proceeds to Step S103. When the operation to start storing of the surrounding environment information is not detected, the processing is ended.

In Step S103, the vehicle-speed threshold determination unit 53 in the vehicle control device 50 calculates a vehicle-speed threshold value allowing improvement of the recognition accuracy of the surrounding environment. In the present embodiment, the vehicle-speed threshold value is set to a predetermined value set in advance. Here, the vehicle-speed threshold value indicates a threshold value of a vehicle speed at which an accuracy error of dead reckoning for calculating a movement distance and a yaw angle by using a wheel pulse of the wheel speed sensor 35 is reduced when the image pickup sensor 17, the short distance measuring sensor 24, the middle distance measuring sensor 22, and the long distance measuring sensor 23 recognize surrounding environment information such as an object, a white line, and a sign in the surrounding environment of the vehicle 1.

The vehicle-speed threshold value is gradually reduced in accordance with the distance from the current position to the target position as in the vehicle-speed threshold values v1 and v2 illustrated in FIG. 13.

In Step S104, the user manually drives the vehicle 1 to start traveling from the storing start position of the surrounding environment information to the target position. During traveling by manual driving, the surrounding environment storage unit 52 recognizes an object, a white line, a sign, or the like in the surrounding environment information of the vehicle 1 by the image pickup sensor 17, the short distance measuring sensor 24, the middle distance measuring sensor 22, and the long distance measuring sensor 23. The surrounding environment storage unit 52 acquires the position of the vehicle 1 from the host vehicle position estimation unit 51.

In this step, as a method of specifying the position of the vehicle 1 by the host vehicle position estimation unit 51, a method of estimating the position of the vehicle 1 with higher accuracy than the GPS, by utilizing dead reckoning of calculating the movement distance and the yaw angle using the wheel pulse of the wheel speed sensor 35 can be used.

The surrounding environment storage unit 52 stores the surrounding environment information transformed into the predetermined coordinate system by the external-recognition-information conversion unit 56 and data obtained by transforming the positional relation of the vehicle 1 into the predetermined coordinate system, based on the recognition result of the surrounding environment information and the position (traveling route) of the vehicle 1 from the host vehicle position estimation unit 51.

The surrounding environment storage unit 52 stores the position of the vehicle 1 in the memory 3 as the target route 112 used during autonomous driving.

In Step S105, the vehicle-speed threshold determination unit 53 determines whether or not the vehicle driven by the user is traveling at a value higher than the vehicle-speed threshold value. When the speed of the vehicle 1 is equal to or smaller than the vehicle-speed threshold value, the processing proceeds to Step S109. On the other hand, when the speed of the vehicle 1 is higher than the vehicle-speed threshold value, the processing proceeds to Step S106.

In Step S106, the vehicle-speed threshold determination unit 53 notifies the user to reduce the speed of the vehicle 1 to be equal to or smaller than the vehicle-speed threshold value. As a notification method, for example, the user is notified by displaying a message (or warning) for reducing the speed of the vehicle 1 on a liquid crystal display (display device 411) or the like.

In Step S107, the vehicle-speed threshold determination unit 53 determines whether or not the speed of the vehicle 1 driven by the user is traveling at the value higher than the vehicle-speed threshold value for a predetermined time. Here, the predetermined time indicates a time set in advance. When the speed of the vehicle 1 exceeds the vehicle-speed threshold value and the predetermined time has elapsed, the vehicle-speed threshold determination unit 53 causes the processing to proceed to Step S108. On the other hand, when the speed of the vehicle 1 is reduced to be equal to or smaller than the vehicle-speed threshold value within a predetermined time, the processing returns to Step S104 to repeat the above processing.

In Step S108, when the speed of the vehicle 1 exceeds the vehicle-speed threshold value for the predetermined time, storing of the surrounding environment information is stopped. As a known method of stopping a storing operation for the user, for example, a notification is performed by displaying the stop of storing of the surrounding environment information and the like on a liquid crystal display (display device 411) or the like.

In Step S109 in which the vehicle speed is equal to or smaller than the vehicle-speed threshold value, the surrounding environment storage unit 52 determines whether or not an operation to end storing of the surrounding environment information has been detected by an operation of the user. Regarding a determination method, the determination can be performed by detecting that the predetermined input switch unit 34 is operated, the shift range is operated to park, the parking brake is operated, or the like. When the operation to end storing of the surrounding environment information is detected, the processing proceeds to Step S110. In a case where the operation to end storing of the surrounding environment information is not detected, the processing returns to Step S104 to repeat the above processing.

In Step S110, the surrounding environment storage unit 52 executes processing of storing the surrounding environment information and the host vehicle position information recognized in Step S104. As the contents of the storing processing, for example, the external-recognition-information conversion unit 56 converts the relation between the recognized surrounding environment information and the host vehicle position into X-Y coordinates with a storing operation start point as an origin. The converted information is stored in the surrounding environment storage unit 52, and a message or the like storing the surrounding environment information is displayed on the liquid crystal display (display device 411) or the like. The coordinate system of the relation between the recognized surrounding environment information and the host vehicle position may have the target position as the origin.

FIG. 15 is a flowchart illustrating processing executed by the vehicle control device 50 when autonomous driving is performed by using the stored surrounding environment information.

In Step S201, the host vehicle position estimation unit 51 in the vehicle control device 50 determines the position of the vehicle 1. This is to determine whether or not the vehicle 1 has approached a start point of the surrounding environment information stored in the surrounding environment storage unit 52 by determining the position of the vehicle 1. In this step, as a method of specifying the position of the vehicle 1, a method of specifying the approximate position of the vehicle 1 by using GPS information of the position detector 36 may be used.

In Step S202, the host vehicle position estimation unit 51 determines whether or not the vehicle 1 has approached the storing start point. Regarding the determination method, this determination can be performed by detecting whether the position information of the vehicle 1 coincides with point information at which storing of the surrounding environment information is started.

In the present embodiment, the host vehicle position estimation unit 51 can specify the position of the vehicle 1 by utilizing GPS information of the position detector 36.

When the position information of the vehicle 1 coincides with the point information at which the storing of the surrounding environment information is started, the host vehicle position estimation unit 51 causes the processing to proceed to Step S203. When the position information of the vehicle 1 does not coincide with the point information at which the storing of the surrounding environment information is started, the processing is ended.

In Step S203, the stored-information collation unit 54 in the vehicle control device 50 executes collation processing between the current position of the vehicle 1 and the host vehicle position information of the surrounding environment information stored in the surrounding environment storage unit 52.

In the collation processing, whether the host vehicle position information calculated by the host vehicle position estimation unit 51 and the positions of an object and a white line recognized by the image pickup sensor 17, the short distance measuring sensor 24, the middle distance measuring sensor 22, and the long distance measuring sensor 23 coincide with the host vehicle position information in the stored surrounding environment information and the positions of an object and a white line recognized by the image pickup sensor 17, the short distance measuring sensor 24, the middle distance measuring sensor 22, and the long distance measuring sensor 23 by a predetermined amount is compared.

Here, the reason of being fixed to be the predetermined amount is that, when the position of the vehicle 1 is GPS information, the accuracy of the host vehicle position information may be decreased. When the host vehicle position estimation unit 51 uses dead reckoning, it is possible to specify the position of the vehicle 1 being traveling with higher accuracy, by collating the detected object, the position information of the white line, and the stored surrounding environment information with each other.

In Step S204, the stored-information collation unit 54 determines whether or not the collation between the position of the vehicle 1 and the host vehicle position information in the stored surrounding environment information has been completed. As a determination method, this determination can be performed by detecting whether the host vehicle position information calculated by the host vehicle position estimation unit 51 and the positions of an object and a white line recognized by the image pickup sensor 17, the short distance measuring sensor 24, the middle distance measuring sensor 22, and the long distance measuring sensor 23 coincide with the host vehicle position information in the stored surrounding environment information and the positions of an object and a white line recognized by the image pickup sensor 17, the short distance measuring sensor 24, the middle distance measuring sensor 22, and the long distance measuring sensor 23.

When the collation between the position of the vehicle 1 and the host vehicle position information in the stored surrounding environment information is completed, the vehicle 1 is transitioned to a state where the vehicle 1 can be autonomously driven. When the collation between the position of the vehicle 1 and the host vehicle position information in the stored surrounding environment information has been completed, the processing proceeds to Step S205. When the collation between the position of the vehicle 1 and the host vehicle position information in the stored surrounding environment information is not completed, the processing returns to Step S203 to repeat the above processing.

In Step S205, the vehicle-speed calculation unit 55 calculates a target vehicle speed for autonomous traveling with tracking the stored target route 112. In the present embodiment, the target vehicle speed is changed in accordance with the distance to the target position from a travel distance from the storing start point to the target position based on the stored traveling route information.

As illustrated in FIG. 13, the vehicle-speed calculation unit 55 calculates the target vehicle speed so as to be equal to or smaller than the vehicle-speed threshold values v1 and v2 corresponding to the distance to the target position. In FIG. 13, from the storing start position (point m1) in the surrounding environment storage unit 52 to the point m2 in the vicinity of a predetermined landmark of the surrounding environment information, the vehicle-speed calculation unit 55 calculates the target vehicle speed so as to be equal to or smaller than the vehicle-speed threshold value v1.

When the vehicle passes through the point m2, the vehicle-speed calculation unit 55 switches to the vehicle-speed threshold value v2 to reduce the target vehicle speed, improve the recognition accuracy of the surrounding environment information, and travel to the point m3 near the target position.

The vehicle-speed calculation unit 55 sets the target vehicle speed so as not to fall below the vehicle speed lower limit value v3 up to the point m3 where parking is started, and secures the accuracy of dead reckoning based on the output of the wheel speed sensor 35.

The vehicle-speed calculation unit 55 releases the limit of the vehicle speed lower limit value v3 in order to perform parking from the point m3, further reduces the target vehicle speed, and performs highly accurate automatic parking toward the target position.

In Step S206, the vehicle control unit 57 in the vehicle control device 50 determines whether or not an instruction for autonomous driving has been detected by the user. Regarding a determination method, such determination can be performed by detecting whether or not the predetermined input switch unit 34 has been operated. When the instruction for the autonomous driving has been detected, the processing proceeds to Step S207. When the instruction for the autonomous driving is not detected, the processing is ended.

In Step S207, the vehicle control unit 57 performs driving control of the vehicle 1 along the target route 112 stored from the surrounding environment information.

In Step S208, the vehicle control unit 57 determines whether or not the vehicle 1 has reached the target position. In the determination method, this determination can be performed when the estimated position of the host vehicle calculated by dead reckoning reaches the target position obtained from the surrounding environment information. When the vehicle 1 has reached the target position, the processing proceeds to Step S209. When the vehicle 1 has not reached the target position, the processing returns to Step S207 to repeat the above processing.

In Step S209, the vehicle control unit 57 ends the control of the vehicle 1. At the end of the control, a message and the like indicating that the vehicle 1 has reached the target position, and thus the vehicle control is ended is displayed on the liquid crystal display (display device 411) or the like.

According to the embodiment of the present invention described above, when the surrounding environment is stored by manual driving, it is possible to reduce the accuracy error by operating the vehicle speed at which the accuracy of the vehicle sensor and the host vehicle position estimation is improved. In addition, when the traveling route and the surrounding environment information stored in the autonomous driving are collated with the current position of the vehicle 1 and the surrounding environment information, it is possible to reduce the accuracy error by controlling the vehicle speed so that the accuracy of the vehicle sensor and the host vehicle position estimation is improved.

Although the preferred embodiment of the present invention have been described, the present invention is not limited to the above-described embodiment, and various modifications can be made without departing from the gist of the present invention.

In addition, in the calculation of the vehicle speed threshold for improving the recognition accuracy illustrated in Step S103, the vehicle-speed threshold value (upper limit value) may be set in advance according to the type of road by using high-accuracy map information, and the vehicle-speed threshold value (or target vehicle speed) may be changed in accordance with the road on which the vehicle travels. For example, the vehicle-speed threshold value is changed in the main road and the community road as the type of road.

In addition, in the calculation of the vehicle-speed threshold value for improving the recognition accuracy illustrated in Step S103, when a speed sign or a road surface sign is recognized by using the image pickup sensor 17 such as a camera, the vehicle-speed threshold value (or the target vehicle speed) may be set to be equal to or smaller than the speed limit recognized from the sign.

In addition, the calculation of the vehicle-speed threshold value for improving the recognition accuracy illustrated in Step S103 may use a distance measuring sensor such as a radar or a sonar. When the distance measuring sensor recognizes an object, the vehicle-speed threshold value may be set to a variable value obtained by calculating the vehicle-speed threshold value from a relation between the position of the vehicle 1 and the position of the object. For example, the vehicle-speed threshold value is changed between a case where the distance between the vehicle 1 and the object is long and a case where the distance is short.

In addition, in the calculation of the vehicle-speed threshold value for improving the recognition accuracy shown in Step S103, the target position may be set in advance using GPS information of a car navigation device or the like, and the vehicle-speed threshold value may be set to a variable value after depending on traveling route information guided from the position of the vehicle 1 to the target position. For example, the vehicle-speed threshold value is changed in a travel distance, a straight section, and a curved section.

In addition, in the notification method for lowering the host vehicle speed to be equal to or smaller than the vehicle-speed threshold value set in the vehicle control device 50 shown in Step S106, when the host vehicle speed exceeds the vehicle speed threshold using a sound output device such as a speaker in the vehicle, a sound for lowering the vehicle speed may be output to notify the user.

Further, in the notification method for lowering the host vehicle speed to be equal to or smaller than the vehicle-speed threshold value determined by the system shown in Step S106, when the host vehicle speed exceeds the vehicle speed threshold using the vibration of the vibrator of the seat installed in the driver seat 413, the vibrator of the driver seat 413 may be vibrated for a certain period of time for notification.

In addition, the calculation of the target vehicle speed at the time of following the stored traveling route shown in Step S205 may be a variable value in which the target vehicle speed is provided in advance according to the type of road using the high-precision map information. For example, as the type of road, the target vehicle speed is changed between a main road and a community road.

In addition, the calculation of the target vehicle speed at the time of tracking the stored traveling route illustrated in Step S205 may use a distance measuring sensor such as a radar or a sonar. When the distance measuring sensor recognizes an object, the target vehicle speed may be set to a variable value obtained by calculating the vehicle-speed threshold value from a relation between the position of the vehicle 1 and the position of the object. For example, the target vehicle speed is changed between a case where the measured distance between the vehicle 1 and the object is long and a case where the measured distance is short.

The calculation of the target vehicle speed at the time of tracking the stored traveling route illustrated in Step S205 may be set to a variable value for calculating the target vehicle speed from a combination of the storing start position, the target position, a straight section, and a curved section, from the stored traveling route information. For example, the target vehicle speed is changed in a straight section near the storing start point, a curved section, a straight section near the target position, and a curved section.

In addition, the surrounding environment storage unit 52 can store the surrounding environment information acquired when the vehicle travels by manual driving with the image pickup sensor 17, the short distance measuring sensor 24, the middle distance measuring sensor 22, and the long distance measuring sensor 23, and the position information (traveling route) of the vehicle 1 output by the host vehicle position estimation unit 51 at this time. However, there is a possibility that information to be stored becomes enormous depending on the traveling route. Thus, the storage capacity of the vehicle control device 50 may be insufficient.

Figure 16:
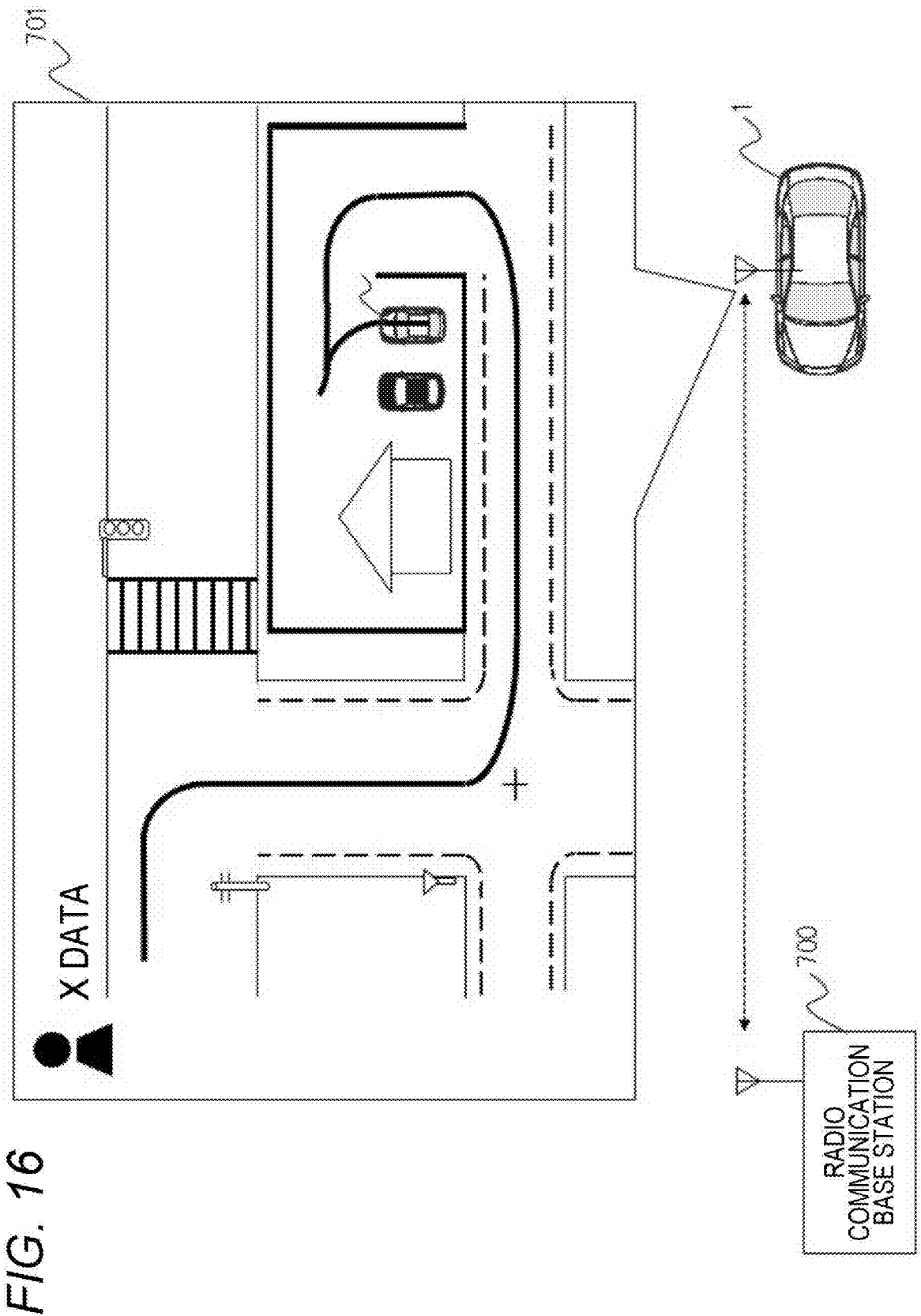
FIG. 16 is a diagram illustrating the embodiment of the present invention and illustrating an example in which, when the surrounding environment information of a vehicle is used, a user who has executed storing processing is specified, and information is acquired from the outside of the vehicle control device.

Therefore, as illustrated in FIG. 16, an example will be described in which, when the surrounding environment information of the vehicle 1 is used, the user who has executed the storing processing is specified, and the information is accumulated outside the vehicle control device 50 or acquired from the outside of the vehicle control device 50. FIG. 16 illustrates the surrounding environment information when information of the user who has executed the storing processing is input to an external data center 701.

The surrounding environment information stored in the surrounding environment storage unit 52 can be accumulated in the external data center by transmitting data to an external facility (data center 701) capable of storing a large amount of data by a communication device (and a radio base station 700). At this time, a method of specifying the user having stored the surrounding environment information is used.

In addition, when there is no surrounding environment information acquired when the vehicle has traveled by manual driving, the surrounding environment storage unit 52 can use a communication device to acquire the surrounding environment information from the external data center 701, a road infrastructure, or the like that manages the surrounding environment information and the host vehicle position information acquired when another vehicle has traveled in the past. By sharing the surrounding environment information with the external data center 701, the road infrastructure, and the like, not only the vehicle 1 but also other vehicles having different vehicle types can autonomously travel by using the surrounding environment information.

As described above, in the vehicle control device 50 in the present embodiment, the traveling route and the surrounding environment information are stored from a desired position (start position) to the target parking position (target position). Then, the vehicle 1 is moved from the start position to the parking position by autonomous driving.

When the vehicle control device 50 starts traveling by manual driving from a position (start position) desired by the user and stores surrounding environment information (an obstacle or a landmark) and a traveling route by each sensor, if the vehicle speed exceeds a predetermined threshold value, the vehicle control device 50 issues a notification for warning and causes the vehicle to travel at a vehicle speed which is equal to or smaller than a predetermined threshold value.

The vehicle control device 50 causes the user to travel the vehicle 1 at an appropriate vehicle speed which is equal to or smaller than a predetermined threshold value, thereby making it possible to improve the accuracy of detecting a traveling route by dead reckoning and the detection accuracy of the surrounding environment information (objects) of each sensor. It is possible to improve the accuracy of the autonomous driving by the highly accurate surrounding environment information and traveling route.

In the above embodiment, the example has been described in which one user causes the vehicle control device 50 to detect the traveling route and the surrounding environment information by manual driving, and then performs autonomous driving with the detected traveling route and surrounding environment information to move to the target position, but the present invention is not limited thereto. For example, each of a plurality of users may perform manual driving to cause the vehicle control device 50 to detect a traveling route and surrounding environment information. Then, when the vehicle moves to a target position by autonomous driving, data to be used in the autonomous driving may be selected from the plurality of users.

Further, in the above embodiment, the example in which the autonomous driving is performed by the vehicle control device 50 has been described, but the present invention is not limited thereto, and may be applied to the vehicle control device 50 that performs automatic parking and steering assistance.

CONCLUSION

As described above, the vehicle control device 50 in the above embodiment can have the following configuration.

(1) A vehicle control device (50) includes a processor (2) and a memory (3) and controls traveling of a vehicle (1). The vehicle control device (50) includes a sensor (image pickup sensor 17, short distance measuring sensor 24, middle distance measuring sensor 22, long distance measuring sensor 23) that acquires surrounding environment information of the vehicle (1), a host vehicle position estimation unit (51) that estimates a traveling route of the vehicle (1), a surrounding environment storage unit (52) that stores the surrounding environment information acquired by the sensor (17) and the traveling route estimated by the host vehicle position estimation unit (51) in association with each other, a vehicle-speed threshold determination unit (53) that sets a vehicle speed threshold value when the surrounding environment storage unit (52) stores the surrounding environment information and the traveling route in association with each other, and determines whether or not a current vehicle speed exceeds the vehicle-speed threshold value when the surrounding environment storage unit (52) stores the surrounding environment information and the traveling route, and a warning unit (41) that performs a notification of an excess of the vehicle speed when the vehicle-speed threshold determination unit (53) determines that the vehicle speed exceeds the vehicle-speed threshold value.

With the above configuration, the vehicle control device 50 notifies the warning device 41 that the vehicle speed exceeds a vehicle-speed threshold value, and thus can cause a user (driver) to reduce the vehicle speed, reliably recognize surrounding environment information, and estimate the position information of the vehicle 1 with high accuracy.

(2) The vehicle control device (50) described in (1) further includes a vehicle control unit (57) that performs autonomous driving based on the traveling route and the surrounding environment information stored in the surrounding environment storage unit (52). The vehicle control unit (57) sets a target vehicle speed which is equal to or smaller than the vehicle-speed threshold value.

With the above configuration, the vehicle control unit 57 sets the target vehicle speed to be equal to or smaller than the vehicle-speed threshold value, and thus can secure the recognition accuracy of the surrounding environment information, and estimate the position (traveling route) of the vehicle 1 by the host vehicle position estimation unit 51 with high accuracy.

(3) The vehicle control device (50) described in (1) further includes an input unit (input switch unit 34) that receives a start position at which storing of surrounding environment information and traveling route is started. The surrounding environment storage unit (52) stores the surrounding environment information and the traveling route in association with each other from the start position to a target position set in advance.

With the above configuration, the vehicle control device 50 can store the surrounding environment information and the traveling route from the start position set by the user (driver) to the predetermined target position, in association with each other.

(4) The vehicle control device (50) described in (2) further includes an input unit (34) that receives a start position at which storing of surrounding environment information and traveling route is started. The surrounding environment storage unit (52) stores the surrounding environment information and the traveling route in association with each other from the start position to a target position set in advance. The vehicle control unit (57) performs autonomous driving in accordance with the surrounding environment information and the traveling route from the start position to the target position, which are stored in the surrounding environment storage unit, when a command of the autonomous driving is received from the input unit (34).

With the above configuration, the vehicle control device 50 stores the surrounding environment information and the traveling route from the start position set by the user (driver) to the predetermined target position, in association with each other. Then, when receiving a command of autonomous driving from the input switch unit 34, the vehicle control device 50 can perform the autonomous driving in accordance with the traveling route from the start position to the target position and the surrounding environment information stored by the surrounding environment information unit (52).

(5) In the vehicle control device (50) described in (1), the surrounding environment storage unit (52) stops storing of the surrounding environment information and the traveling route when the vehicle has traveled at a vehicle speed exceeding the vehicle-speed threshold value for a predetermined time or longer.

With the above configuration, when the user (driver) neglects the notification from the warning device 41 and continues driving for a predetermined time or longer at a vehicle speed exceeding the vehicle-speed threshold value, the user pays attention to the storage in the surrounding environment storage unit 52. Thus, when the vehicle speed is high, the accuracy of the position information due to the deflection of the tire 16 and the detection accuracy of the image pickup sensor 17 and each distance measuring sensor are reduced. Therefore, the surrounding environment storage unit 52 can suppress generation of the surrounding environment information and the traveling route with low accuracy by discarding the information of a region of exceeding the vehicle-speed threshold value.

(6) In the vehicle control device (50) described in (1) or (2), the host vehicle position estimation unit (51) detects the number of revolutions of a wheel of the vehicle and estimates a position of the vehicle from the number of revolutions.

With the above configuration, the host vehicle position estimation unit 51 can generate a highly accurate traveling route by estimating the position of the vehicle 1 by dead reckoning or the like from the output from the wheel speed sensor 35.

(7) In the vehicle control device (50) described in (1) or (2), the vehicle-speed threshold determination unit (53) sets the vehicle-speed threshold value as an upper limit value of a vehicle speed allowing accuracy of estimating the position of the vehicle to be secured.

With the above configuration, the vehicle control device 50 can generate a highly accurate traveling route while preventing a reduction in accuracy of position information due to deflection of the tire 16 or the like.

(8) In the vehicle control device (50) described in (7), the vehicle-speed threshold value is set to be equal to or greater than a lower limit value (v3) of a vehicle speed allowing accuracy of estimating a position of the vehicle to be secured.

With the above configuration, when the vehicle speed is reduced, the rate of the pulse detected by the wheel speed sensor 35 is also reduced. However, by traveling at a vehicle speed which is equal to or smaller than the lower limit value (v3), it is possible to prevent reduction in the accuracy of a trajectory of the traveling route calculated based on the pulse.

(9) In the vehicle control device (50) described in (2), the vehicle control unit (57) refers to road map information to acquire a speed limit from road type information during traveling, and set a target vehicle speed to be equal to or smaller than the speed limit.

With the above configuration, the vehicle control device 50 can set the target vehicle speed in accordance with a travel environment.

(10) In the vehicle control device (50) described in (2), when the surrounding environment information includes a sign indicating a speed limit, the vehicle control unit (57) sets the target vehicle speed to be equal to or smaller than a value of the sign.

With the above configuration, the vehicle control device 50 can set the target vehicle speed in accordance with a travel environment.

(11) In the vehicle control device (50) described in (2), the vehicle control unit (57) changes the target vehicle speed in accordance with a relation between a position of the vehicle (1) estimated by the host vehicle position estimation unit (51) and a target position set in advance.

With the above configuration, the vehicle control device 50 can change the target vehicle speed in accordance with the distance to the target position and perform the autonomous driving toward the target position while securing the recognition accuracy.

(12) In the vehicle control device (50) described in (2), the host vehicle position estimation unit (51) estimates a position of the vehicle by using information of a satellite positioning system, and changes a target vehicle speed in accordance with a distance to a target position set in advance.

With the above configuration, the vehicle control device 50 can change the target vehicle speed in accordance with the distance from the position of the vehicle 1 to the target position based on GPS information, and perform the autonomous driving toward the target position while securing the recognition accuracy.

(13) In the vehicle control device (50) described in (1), the surrounding environment storage unit (52) stores the surrounding environment information and the traveling route in an external device (701).

With the above configuration, even when the amount of data of the surrounding environment information and the traveling route increases, it is possible to reliably store the surrounding environment information and the traveling route in the external data center 701.

(14) In the vehicle control device (50) described in (2), the surrounding environment storage unit (52) stores the surrounding environment information and the traveling route in an external device (701), and the vehicle control unit (57) acquires the traveling route and the surrounding environment information stored in the external device (701), and performs the autonomous driving.

With the above configuration, even when the amount of data of the surrounding environment information and the traveling route increases, it is possible to perform the autonomous driving by acquiring the surrounding environment information and the traveling route from the external data center 701.

Note that, the present invention is not limited to the above example, and various modifications may be provided. For example, the above embodiments are described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Further, for some of the components in the embodiments, any of addition, deletion, or replacement of other components can be applied singly or in combination.

Some or all of the configurations, functions, functional units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and a solid state drive (SSD), or a recording medium such as an IC card, an SD card, and a DVD.

Control lines and information lines considered necessary for the descriptions are illustrated, and not all the control lines and the information lines in the product are necessarily shown. In practice, it may be considered that almost all components are connected to each other.

REFERENCE SIGNS LIST 1 vehicle
2 processor
3 memory
11 engine
12 automatic transmission
13 propeller shaft
14 differential gear
15 drive shaft
16 wheel
17 image pickup sensor
19 various sensors
20 brake device
21 electric power steering
22 middle distance measuring sensor
23 long distance measuring sensor
24 short distance measuring sensor
34 input switch unit
35 wheel sensor
36 position detector
37 communication device
40 various-sensor/actuator ECU
41 warning unit
50 vehicle control device
51 host vehicle position estimation unit
52 surrounding environment storage unit
53 vehicle-speed threshold determination unit
54 stored-information collation unit
55 vehicle-speed calculation unit
56 external-recognition-information conversion unit
57 vehicle control unit
24A to 24L short distance measuring sensor
17A to 17D image pickup sensor
22A to 22D middle distance measuring sensor
23 long distance measuring sensor

The invention claimed is:

1. A vehicle control device that includes a processor and a memory and controls traveling of a vehicle, the vehicle control device comprising:

a sensor that acquires surrounding environment information of the vehicle;
a host vehicle position estimation unit that estimates a traveling route of the vehicle;
a surrounding environment storage unit that stores the surrounding environment information acquired by the sensor and the traveling route estimated by the host vehicle position estimation unit in association with each other;
a vehicle-speed threshold determination unit that sets a vehicle-speed threshold value when the surrounding environment storage unit stores the surrounding environment information and the traveling route in association with each other, and determines whether or not a current vehicle speed exceeds the vehicle-speed threshold value when the surrounding environment storage unit stores the surrounding environment information and the traveling route;
a warning unit that performs a notification of an excess of the vehicle speed when the vehicle-speed threshold determination unit determines that the vehicle speed exceeds the vehicle-speed threshold value, and
an input unit that receives a start point m1 at which storing of surrounding environment information and traveling route is started,
wherein the surrounding environment storage unit stores the surrounding environment information and the traveling route in association with each other from the start point m1 to a target position set in advance,
wherein the vehicle-speed threshold determination unit sets an upper limit of the vehicle-speed threshold value as a first vehicle-speed threshold value v1 from the start point m1 to a point m2 where the vehicle approaches near a landmark that is recognized,
sets the upper limit of the vehicle-speed threshold value as a second vehicle-speed threshold value v2 lower than the first vehicle-speed threshold value v1 from the point m2 to a point m3 where parking is started, and
sets a vehicle speed lower limit value v3 as lower than the second vehicle-speed threshold value v2 in a range where estimation accuracy of the host vehicle position is secured; the vehicle control device further comprising:
a vehicle control unit that performs autonomous driving based on the traveling route and the surrounding environment information stored in the surrounding environment storage unit,
wherein the vehicle control unit
performs autonomous driving in accordance with the surrounding environment information and the traveling route from the start point m1 to the target position, which are stored in the surrounding environment storage unit, when a command of the autonomous driving is received from the input unit,
in the region from the start point m1 to the point m2, sets the upper limit of a target vehicle-speed as the first vehicle-speed threshold value v1, the vehicle speed lower limit value v3 in the range where estimation accuracy of the host vehicle position is secured, and the target vehicle-speed as between the first vehicle-speed threshold value v1 and the vehicle speed lower limit value v3,
in the region from the point m2 to near the point m3, sets the upper limit of a target vehicle-speed as the second vehicle-speed threshold value v2, the vehicle speed lower limit value v3 in the range where estimation accuracy of the host vehicle position is secured, and the target vehicle-speed as between the second vehicle-speed threshold value v2 and the vehicle speed lower limit value v3, in the region from the point m3, releases the limit of the vehicle speed lower limit value v3 in order to perform parking, further reduces the target vehicle speed, and performs automatic parking toward the target position.

2. The vehicle control device according to claim 1, wherein the surrounding environment storage unit stops storing of the surrounding environment information and the traveling route when the vehicle has traveled at a vehicle speed exceeding the vehicle-speed threshold value for a predetermined time or longer.

3. The vehicle control device according to claim 1, wherein the host vehicle position estimation unit detects a number of revolutions of a wheel of the vehicle, and estimates a position of the vehicle from the number of revolutions.

4. The vehicle control device according to claim 1, wherein the vehicle control unit refers to road map information to acquire a speed limit from road type information of traveling road, and set the target vehicle speed to be equal to or smaller than the speed limit.

5. The vehicle control device according to claim 1, wherein, when the surrounding environment information includes a sign indicating a speed limit, the vehicle control unit sets the target vehicle speed to be equal to or smaller than a value of the sign.

6. The vehicle control device according to claim 1, wherein the host vehicle position estimation unit estimates a position of the vehicle by using information of a satellite positioning system, and changes the target vehicle speed in accordance with a distance to the target position set in advance.

7. The vehicle control device according to claim 1, wherein the surrounding environment storage unit stores the surrounding environment information and the traveling route in an external device.

8. The vehicle control device according to claim 1 wherein the surrounding environment storage unit stores the surrounding environment information and the traveling route in an external device, and the vehicle control unit acquires the traveling route and the surrounding environment information stored in the external device, and performs the autonomous driving.

* * * * *